US008060682B1

(12) United States Patent
Genetti et al.

(10) Patent No.: US 8,060,682 B1
(45) Date of Patent: Nov. 15, 2011

(54) METHOD AND SYSTEM FOR MULTI-LEVEL SWITCH CONFIGURATION

(75) Inventors: Wayne A. Genetti, Sanatoga, PA (US); Brent R. Rothermel, Pottstown, PA (US); Vladimir Tamarkin, Huntingdon Valley, PA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 357 days.

(21) Appl. No.: 12/415,873

(22) Filed: Mar. 31, 2009

Related U.S. Application Data

(60) Provisional application No. 61/114,893, filed on Nov. 14, 2008.

(51) Int. Cl.
  *G06F 13/00* (2006.01)
  *H04L 5/20* (2006.01)
(52) U.S. Cl. .................................. 710/317; 370/400
(58) Field of Classification Search .................. 710/300, 710/301, 316, 317; 370/400, 401, 408, 422, 370/423
  See application file for complete search history.

(56) References Cited

U.S. PATENT DOCUMENTS

| | | | | | |
|---|---|---|---|---|---|
| 4,703,394 | A * | 10/1987 | Petit et al. | ...................... | 361/790 |
| 5,887,158 | A * | 3/1999 | Sample et al. | ................. | 716/137 |
| 5,983,260 | A * | 11/1999 | Hauser et al. | ................. | 709/201 |
| 5,999,527 | A * | 12/1999 | Petersen | ........................ | 370/360 |
| 6,049,542 | A * | 4/2000 | Prasad | ........................... | 370/386 |
| 6,392,142 | B1 * | 5/2002 | Uzuka et al. | ................... | 174/541 |
| 6,403,893 | B2 * | 6/2002 | Achari et al. | .................. | 174/255 |
| 6,528,737 | B1 * | 3/2003 | Kwong et al. | ................. | 174/262 |
| 6,608,762 | B2 * | 8/2003 | Patriche | ........................ | 361/788 |
| 6,748,474 | B1 * | 6/2004 | Caldara et al. | ................ | 710/301 |
| 6,760,339 | B1 * | 7/2004 | Noel et al. | ..................... | 370/401 |
| 7,023,845 | B1 * | 4/2006 | Simons et al. | ................. | 370/389 |
| 7,052,288 | B1 * | 5/2006 | Minich | ........................... | 439/78 |
| 7,108,556 | B2 * | 9/2006 | Cohen et al. | ............. | 439/607.08 |
| 7,206,888 | B2 * | 4/2007 | Byers et al. | .................... | 710/316 |
| 7,339,785 | B2 * | 3/2008 | Colborn et al. | .......... | 361/679.33 |
| 7,422,484 | B2 * | 9/2008 | Cohen et al. | ............. | 439/607.05 |
| 7,468,894 | B2 * | 12/2008 | Bibee | ........................... | 361/788 |
| 7,516,272 | B2 * | 4/2009 | Felton et al. | ................... | 711/112 |
| 7,765,347 | B2 * | 7/2010 | King et al. | ..................... | 710/100 |
| 7,865,596 | B2 * | 1/2011 | Grosner et al. | ............... | 709/226 |
| 2010/0165883 | A1 * | 7/2010 | Holness et al. | ............... | 370/255 |

* cited by examiner

*Primary Examiner* — Khanh Dang
(74) *Attorney, Agent, or Firm* — Klein, O'Neill & Singh, LLP

(57) ABSTRACT

System and method to configure switch systems are disclosed. A switch system includes leaf modules with internal ports and spine modules with ports. A midplane includes first layers closer to a first side, second layers closer to a second side and third layers between the first layers and the second layers. The midplane receives the leaf modules and the spine modules about both the first side and the second side. Conductors of the third layers couple internal ports of the leaf modules about one side to a port of spine modules about the other side. Conductors of the first layers couple internal ports of the leaf modules with ports of the spine modules about the first side. Conductors of the second layers couple internal ports of the leaf modules with ports of the spine modules about the second side.

13 Claims, 16 Drawing Sheets

METHOD AND SYSTEM FOR MULTI-LEVEL SWITCH CONFIGURATION

CROSS REFERENCE TO RELATED APPLICATIONS

This application claims priority to U.S. provisional patent application Ser. No. 61/114,893, filed on Nov. 14, 2008, the disclosure of which is incorporated herein by reference in its entirety.

BACKGROUND

1. Technical Field

The present invention relates to networks, and more particularly, to networks with plurality of switches.

2. Related Art

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

A network switch is typically a multi-port device where each port manages a point-to-point connection between itself and a port of another system. Each port can be attached to a port of another server, peripheral, input/output subsystem, bridge, hub, router, or another switch. The term network switch as used herein includes a multi-level switch that uses plural switching elements within a single switch chassis to route data packets.

Clusters of systems are built by using multiple switches in one or more chassis. A multi-level switch that uses plural switching elements within a single switch chassis may be used as a building block to build a cluster. Multiple systems are interconnected, by connecting ports of a system with ports of other systems in the clusters through for example, one or more multi-level switches.

Initially, a cluster may include a minimal number of systems coupled through one or more multi-level switches, with each multi-level switch providing a certain level of expandability. As computing needs increase, additional systems may be added to expand the cluster. As the cluster grows, there may be a need to add additional multi-level switches or add additional ports to couple additional systems or additional switches.

In a multi-level switch that uses plural switching elements within a single switch chassis, there is a need to couple plural switching elements, within the chassis. The coupling between switching elements is typically accomplished using a backplane. As the number of switching elements and the number of ports in a switching element increase, the coupling between plural switching elements becomes complex.

For example, a port of each switching element needs to be coupled to a port of other switching elements. The switching elements are coupled to the signal lines of the backplane using a plurality of connectors with pins. A plurality of conductors are used to couple the pins in the backplane. As the number of ports increases, there is a need to come up with better way of coupling ports of switching elements.

It is with one or more of these needs in mind that the current disclosure arises.

SUMMARY

In one embodiment, a switch system to network plurality of systems is disclosed. The switch system includes a plurality of leaf modules, a plurality of spine modules and a midplane. Each of the leaf modules have a plurality of internal ports. Each of the spine modules have a plurality of ports. The midplane includes a plurality of first layers, a plurality of second layers and a plurality of third layers. The plurality of first layers is disposed closer to a first side of the midplane. The plurality of second layers is disposed closer to a second side of the midplane. The plurality of third layers is disposed between the plurality of first layers and the plurality of second layers. The midplane is configured to receive the plurality of leaf modules and the plurality of spine modules about both the first side and the second side. A plurality of conductors disposed about the third layer is configured to couple internal ports of the leaf modules disposed about one side to a port of spine modules disposed about the other side.

In another embodiment, a chassis for a switch system is disclosed. The chassis includes a midplane. The midplane includes a circuit board carrier having a first side and a second side opposite the first side. The circuit board carrier further includes a plurality of first layers disposed closer to the first side, a plurality of second layer disposed closer to the second side and a plurality of third layer disposed between the first layer and the second layer. A plurality of conductors is disposed on the plurality of first layer, second layer and the third layer. A plurality of first midplane connectors is disposed on both the first side and the second side. A plurality of second midplane connectors are disposed on both the first side and the second side. The first midplane connectors are coupled to the second midplane connectors through one or more conductors such that conductors on the plurality of first layers couple the first midplane connectors and the second midplane connectors disposed on the first side, the conductors on the plurality of second layers couple the first midplane connector to the second connectors disposed on the second side and the conductors on the plurality third layer couple first midplane connector on one side to second midplane connectors on the other side.

In another embodiment a method to configure switch system is disclosed. The method includes providing a midplane with a plurality of first layers, a plurality of second layers and a plurality of third layers; disposing the plurality of first layers closer to a first side of the midplane, the plurality of second layers closer to a second side of the midplane and the plurality of third layers between the first layers and the second layers; providing a plurality of leaf modules with internal ports about both the first side and the second side; providing a plurality of spine modules with ports about both the first side and the second side; and coupling internal ports of the leaf modules disposed about one side of the midplane to a port of the plurality of spine modules disposed about the other side.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Definitions

The following definitions are provided for convenience as they are typically (but not exclusively) used in network systems and in general networking environment, implementing the various adaptive aspects described herein.

"Backplane" means a collection of a plurality of connectors, typically disposed on a side of a circuit board carrier, with one or more pins of a connector coupled to one or more pins of another connector through conductors in the circuit board carrier. The connectors are typically configured to receive circuit boards with components and couple components of one circuit board to components of other circuit boards, through the conductors in the circuit board carrier.

"Leaf Module" means a switch with a plurality of ports, with some ports configured to couple to systems and some ports configured to couple to other switches.

"Midplane" means a collection of a plurality of connectors, typically disposed on both sides of a circuit board carrier, with one or more pins of a connector coupled to one or more pins of another connector through conductors in the circuit board carrier. The connectors are typically configured to receive circuit boards with components on both sides of the circuit board carrier and couple components of one circuit board to components of other circuit boards, through the conductors in the circuit board carrier.

"Multi Level Switch" means a network switch that includes a plurality of switch elements operationally coupled together.

"Spine Module" means a switch with a plurality of ports configured to couple to ports of other switches. Other switches may be leaf modules.

"Switch" means a networked device that facilities network communication conforming to certain protocols/standards, for example, the Infiniband (IB) protocol.

To facilitate an understanding of the various embodiments, the general architecture and operation of a network system will be described. The specific architecture and operation of the various embodiments will then be described with reference to the general architecture of the network system.

Various network protocols/standards are used for network communication. IF is one such standard. IF is a switched fabric interconnect standard typically deployed for server clusters/enterprise data centers ranging from two to thousands of nodes. The IB standard is published by the InfiniBand Trade Association, and is incorporated herein by reference in its entirety.

An IB switch is typically a multi-port device. Physical links (optical or copper) connect each port in a switch to another IB switch or an end device (for example, a Target Channel Adapter (TCA) or a Host Channel Adapter (HCA)).

Figure 1A:
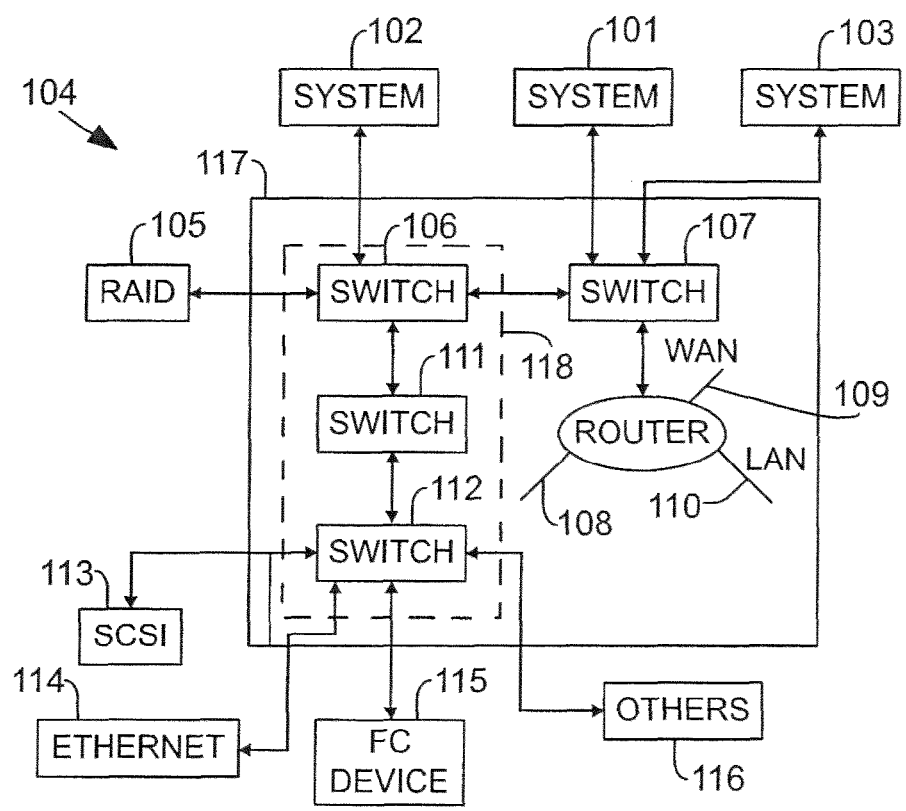
FIG. 1A shows a block diagram of a network system, according to one embodiment.

FIG. 1A shows a block diagram of a network system 104. System 104 includes a switching fabric 117, which includes plural network switches 106, 107, 111 and 112 for moving network packets. Fabric 117 also includes a router 108 that is coupled to a wide area network 109 and local area network 110.

Switch 106 is operationally coupled to storage system 105 (for example, a RAID (redundant array of inexpensive disks) system) and to system 102, while system 101 and 103 may be operationally coupled to switch 107.

Switch 112 may be coupled to a small computer system interface ("SCSI") SCSI port 113 that is coupled to SCSI based devices (not shown). Switch 112 may also be coupled to an Ethernet port 114, Fibre Channel device 115 and other device(s) 116.

Switch 111 may couple switches 106 and 112 to enable communication between a system connected to switch 106 and a system connected to switch 112. In some embodiments, switch 111 is referred to as a spine module and switches 106 and 112 are referred to as leaf modules.

Switches 106, 111 and 112 may be interconnected within a fabric 117, using for example, one or more connectors. In some embodiments, a backplane with one or more connectors may be used to receive the leaf modules and the spine modules. An embodiment of a backplane is referred to as a midplane. In one embodiment, the midplane includes an elongated that has one or more connectors disposed on both sides of the elongated body so that switch modules may be physically received on both sides of the midplane. In one embodiment, a midplane may be configured to receive multiple switch modules on both sides of the midplane.

The connectors of the midplane may include a plurality of pins or electrical traces to provide electrical coupling to the switch modules. The midplane may further include electrical conductors to interconnect various pins of the connectors so that switch modules may communicate with each others. As an example, a midplane may be configured to electrically couple a leaf module and a spine module.

In some embodiments, switches 106, 111 and 112 may be housed in a common chassis 118 with a backplane or a midplane. The common chassis 118 may include power supply (not shown) to power the switches 106, 111 and 122. The common chassis 118 may also include cooling systems (not shown) to cool the switches 106, 111 and 112.

Systems 101-103 may be computing systems that typically include several functional components. These components may include a central processing unit (CPU), main memory, input/output ("I/O") input/output devices, and streaming storage devices (for example, tape drives). In typical computing systems 101-103, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system or host computing system.

Figure 1B:
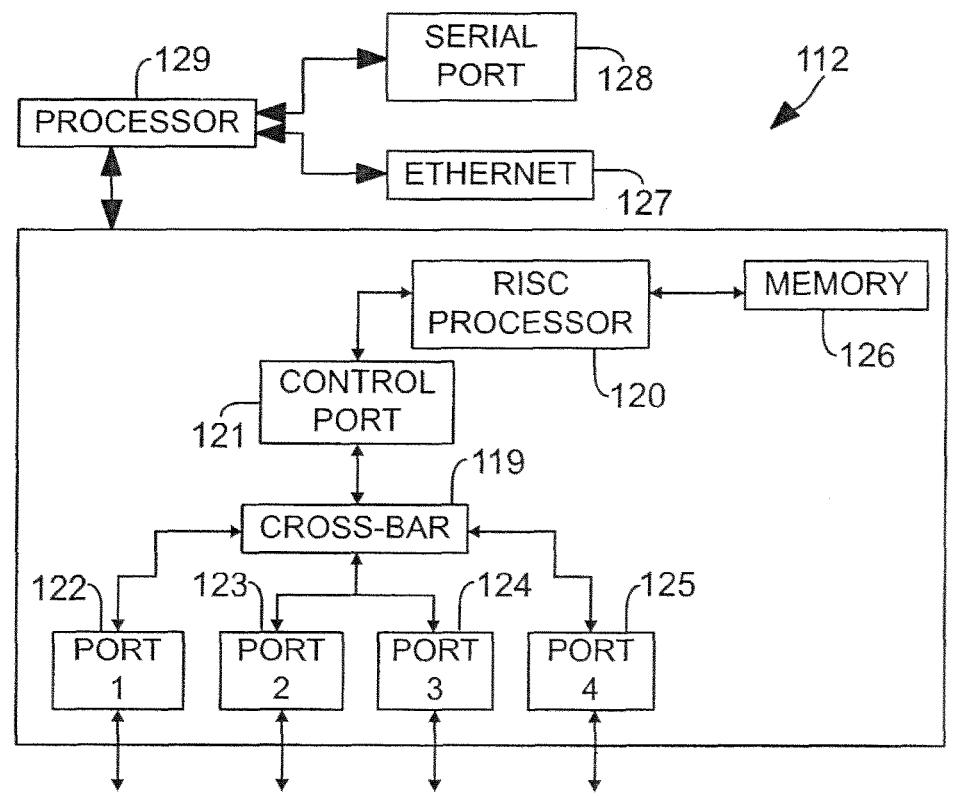
FIG. 1B shows a block diagram of a switch in a network system, according to one embodiment.

FIG. 1B shows a block diagram of switch 112 that includes a processor 120, which is operationally coupled to plural ports 122, 123, 124 and 125 via a control port 121, and crossbar 119. In one embodiment, processor 120 may be a reduced instruction set computer (RISC) type microprocessor. In one embodiment, the switch 112 may be referred to as a leaf module.

Switch 112 may be coupled to an external processor 129 that is coupled to an Ethernet port 127 and serial port 128. In one embodiment, processor 129 may be a part of a computing system (for example, 101-103). An administrator may use processor 129 to configure switch 112.

Figure 1C:
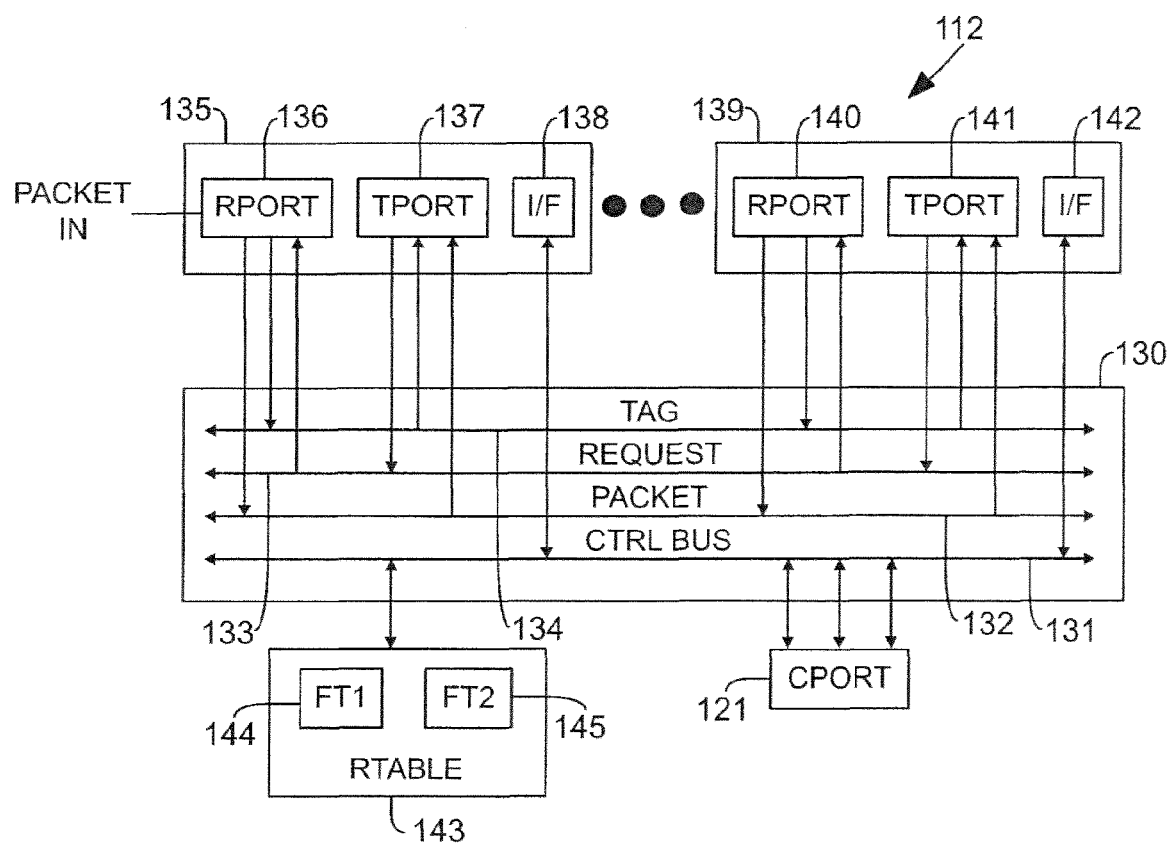
FIG. 1C shows another block diagram of switch, according to one embodiment.

FIG. 1C shows another block diagram of a switch 112 (or switch element 112) with a switch fabric 130. Switch fabric 130 is operationally coupled to control port (CPORT) 121 and plural ports 135 and 139. It is noteworthy that ports 135 and 139 are similar to ports 122-125.

Switch fabric 130 includes a packet data crossbar 132, packet request crossbar 123 and packet tag crossbar 134 and a control bus 131.

Packet data crossbar 132 connects receive ports (136, 140) and transmit ports (137,141), and can concurrently transmit plural packets.

Packet Tag crossbar 133 may also be used to move plural packet tags from receive ports (136, 140) to transmit ports (137, 141), as described below.

Packet request crossbar 133 is used by transmit port (137, 141) to request a particular packet from a receive buffer.

Interface (I/F) 138 and 142 provide input/output interface to switch 112.

Switch 112 may be implemented as a switch element of a single CMOS ASIC (application specific integrated circuit), and for this reason the term "switch", "switch element" and ASIC are used interchangeably to refer to the various embodiments in this specification.

Referring to FIG. 1A, in one embodiment, the switch 106 as a leaf module may be similar to switch 112 and may be configured as a leaf module. In another embodiment, switch 111 may be similar to switch 112 and may be configured as a spine module to couple two switches, for example, switch 106 and switch 112. In such a configuration, ports of switch 111 (for example, similar to ports 122-125 of switch 112) may be configured to be coupled to ports of other spine modules (not shown) or other leaf modules (for example, switch 106 and switch 112).

Figure 1D:
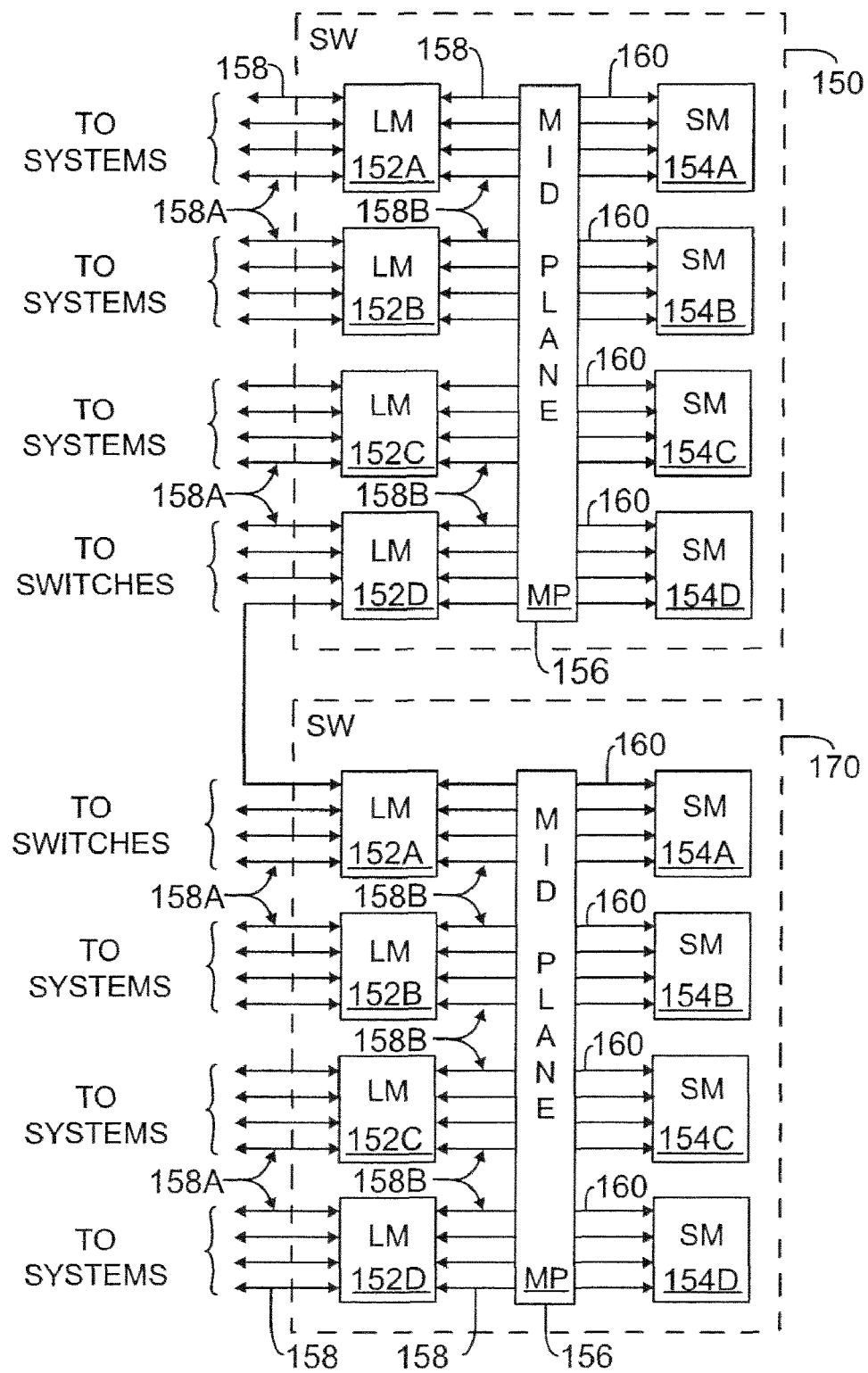
FIG. 1D shows a plurality of switch fabrics, with exemplary coupling within the switch fabric and between the switch fabrics.

FIG. 1D shows switch fabrics 150 and 170 with exemplary coupling within the switch fabrics 150, 170 and between the switch fabrics 150 and 170. In one embodiment, switch fabrics 150 and 170 may each contained in a separate enclosure. Switch fabrics 150, 170 include a plurality of leaf modules 152A-D, a plurality of spine modules 154A-D and a midplane 156 providing interconnection between leaf modules 152A-D and spine modules 154A-D. In one embodiment, the plurality of leaf modules 152A-D, plurality of spine modules 154A-D and the midplane 156 of switch fabrics 150 and 170 may each be housed in a common chassis.

Each of the leaf modules 152A-D include a plurality of ports 158. Each of the spine modules 154A-D include a plurality of ports 160. The plurality of ports 158 of each of the leaf module 152A-D are divided into external ports 158A and internal ports 158B.

The plurality of external ports of a leaf module are used to couple to ports of other systems or ports of other switch fabrics. As an example, one of the external ports 158A of leaf module 152A may be coupled to a port of a system (not shown). As another example, one of the external ports 158A of leaf module 152D of switch fabric 150 may be coupled to one of the external ports 158A of leaf module 158A of switch fabric 170.

The plurality of internal ports 158B of a leaf module 152A-1520 is coupled to a port 160 of a some module 154A-154D. In one embodiment, the coupling between an internal port 158B of a leaf module 152A-152D and a port 160 of a spine module 154A-154F is accomplished using the midplane 156.

Figure 2A:
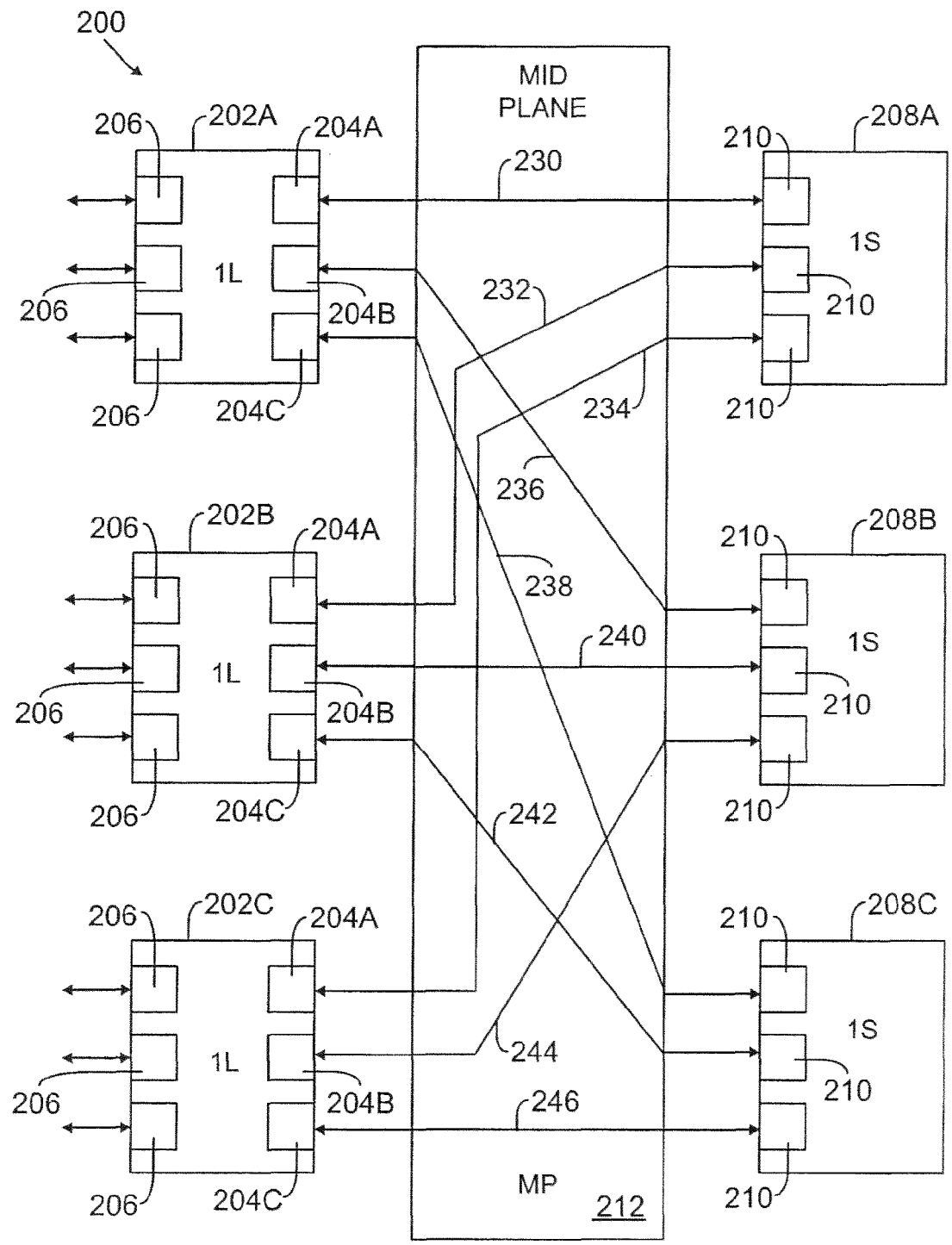
FIG. 2 show a switch system, according to one embodiment of this disclosure.

FIG. 2A shows an exemplary switch system 200 with midplane 212 configured to receive a plurality of first leaf modules 202A-C and a plurality of first spine modules 208A-C. The midplane 212 is further configured to couple the plurality of first leaf modules 202A-C to the plurality of first spine modules 208A-C. Further details of system 200 will be described in detail below.

Referring to FIG. 2A, the first leaf modules 202A-C each include a plurality of external ports 206 and a plurality of internal ports 204A-C. The first spine modules 208A-C each include a plurality of ports 210.

One skilled in the art can appreciate that although the examples described above use specific number of internal and external ports, these concepts can be used with leaf modules and spine modules having different number of ports than what is described above with reference to FIG. 2A.

The midplane 212 is configured to couple each of the internal ports 204A-204C of the first leaf modules 202A-202C to a port 210 of first spine modules 208A-208C. Signal lines 230, 232, 234, 236, 238, 240, 242, 244 and 246 couple an internal port 204A-204C of a first leaf module 202A-202C to a port 210 of a first spine module 208A-208C.

In one embodiment, the first leaf module includes a leaf module connector that facilitates the coupling of the internal ports 204A-204C of first leaf modules 202A-202C to the signal lines of the midplane 212. In one embodiment, the first spine module 208A-208C includes a spine module connector that facilitates the coupling of the signal lines of the midplane 212 to the ports 210 of the first spine module 208A-208C.

In one embodiment, the midplane 212 may include a plurality of midplane connectors to receive the leaf module connectors and the spine module connectors to facilitate the coupling of the signal lines of the midplane 212 to the internal ports 204A-204C of the first leaf modules 202A-202C and the ports 210 of the first spine modules 208A-208C.

It is desirable to minimize the number of hops required to communicate between a system connected to external port of one leaf module and another system connected to an external port of another leaf module. A hop corresponds to data transfer from an input port to an output port of a leaf module or a spine module.

In one embodiment, at least one of the internal ports of each leaf module is coupled to at least one port of each spine module, to minimize the number of hops required to communicate between systems connected to external ports of two different leaf modules.

For example, as shown in FIG. 2A, a source system coupled to an external port 206 of first leaf module 202A can communicate with a destination system coupled to an external port 206 of first leaf module 202C within three hops. The first leaf module 202A and first leaf module 2020 are both coupled to a common first spine module 208C. A data packet is transferred from the first leaf module 202A to first leaf module 202C through the common first spine module 208C.

The first hop occurs when a data packet from the external port 206 of first leaf module 202A is transferred to the internal port 204O of first leaf module 202A. The internal port 204O of the first leaf module 202A is coupled to a port 210 of the first spine module 208O through signal line 238. The transferred data packet is presented to the port 210 of the first spine module 208O using the signal line 238.

The second hop occurs when the data packet transfers from the port 210 of the first spine module 208C coupled to the first leaf module 202A to the port 210 of the first spine module 208C coupled to the first leaf module 202C. The data packet is now presented to the internal port 204C of first leaf module 202O using signal line 246.

The third hop occurs when the data transfers from the internal port 204O of the first leaf module 202O to the external port 206 of the first leaf module 202c coupled to the destination system.

In one embodiment, an ASIC with multiple ports may be configured to create a first leaf module and a first spine module.

In one embodiment, the first leaf module includes a leaf module connector that facilitates the coupling of the internal ports 204A-204C of first leaf modules 202A-202C to the signal lines of the midplane 212. In one embodiment, the first spine module 208A-208C includes a spine module connector that facilitates the coupling of the signal lines of the midplane 212 to the ports 210 of the first spine module 208A-208C.

In one embodiment, the midplane 212 may include a plurality of midplane connectors to receive the leaf module connectors and the spine module connectors to facilitate the coupling of the signal lines of the midplane 212 to the internal ports 204A-204C of the first leaf modules 202A-202C and the ports 210 of the first spine modules 208A-208C.

One skilled in the art can appreciate that although the examples described above use specific number of internal and external ports, these concepts can be used with leaf modules and spine modules having different number of ports than what is described above with reference to FIG. 2A.

Figure 3A:
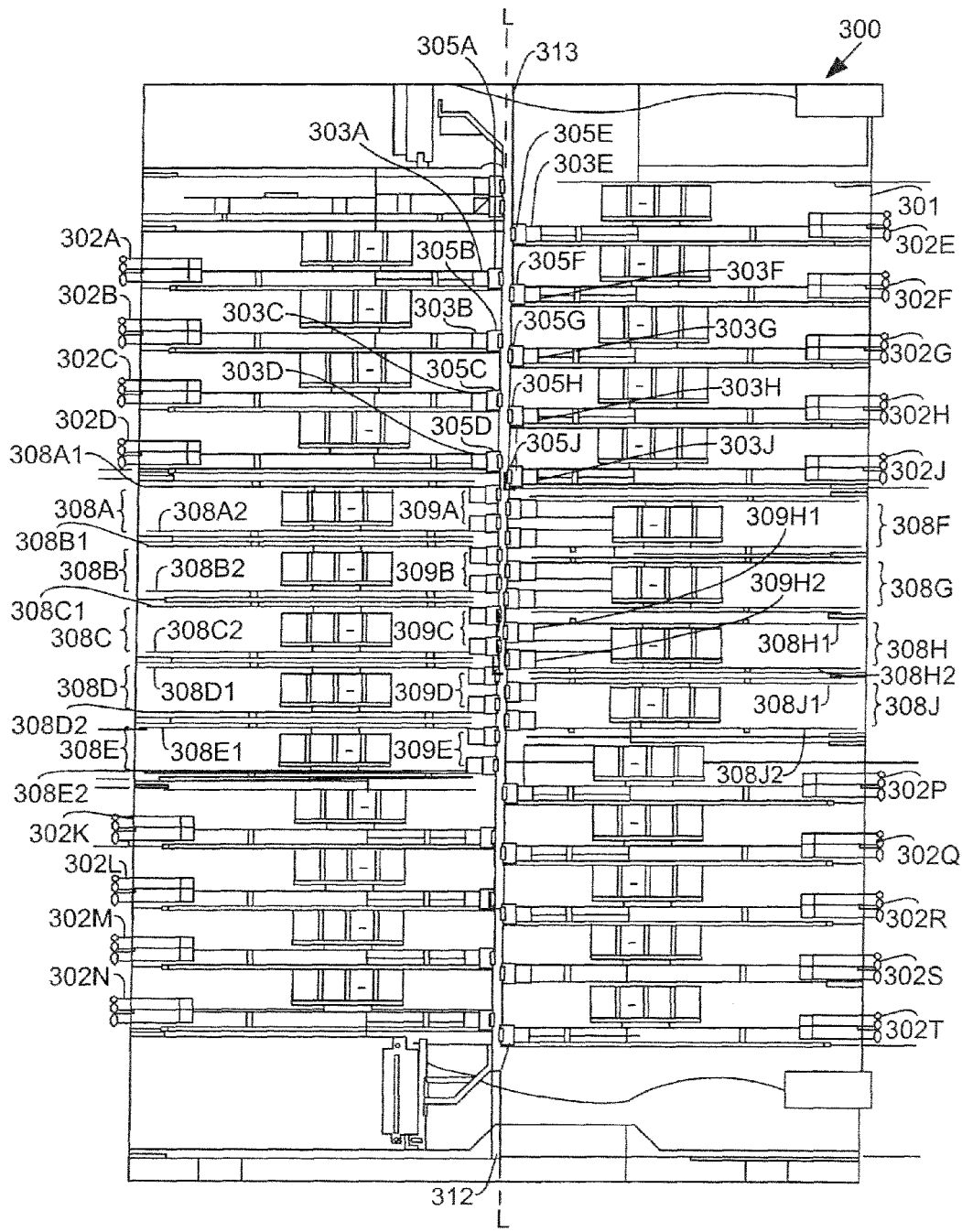
FIG. 3A shows a cross-sectional view of a switch system according to one embodiment of this disclosure.
Figure 3B:
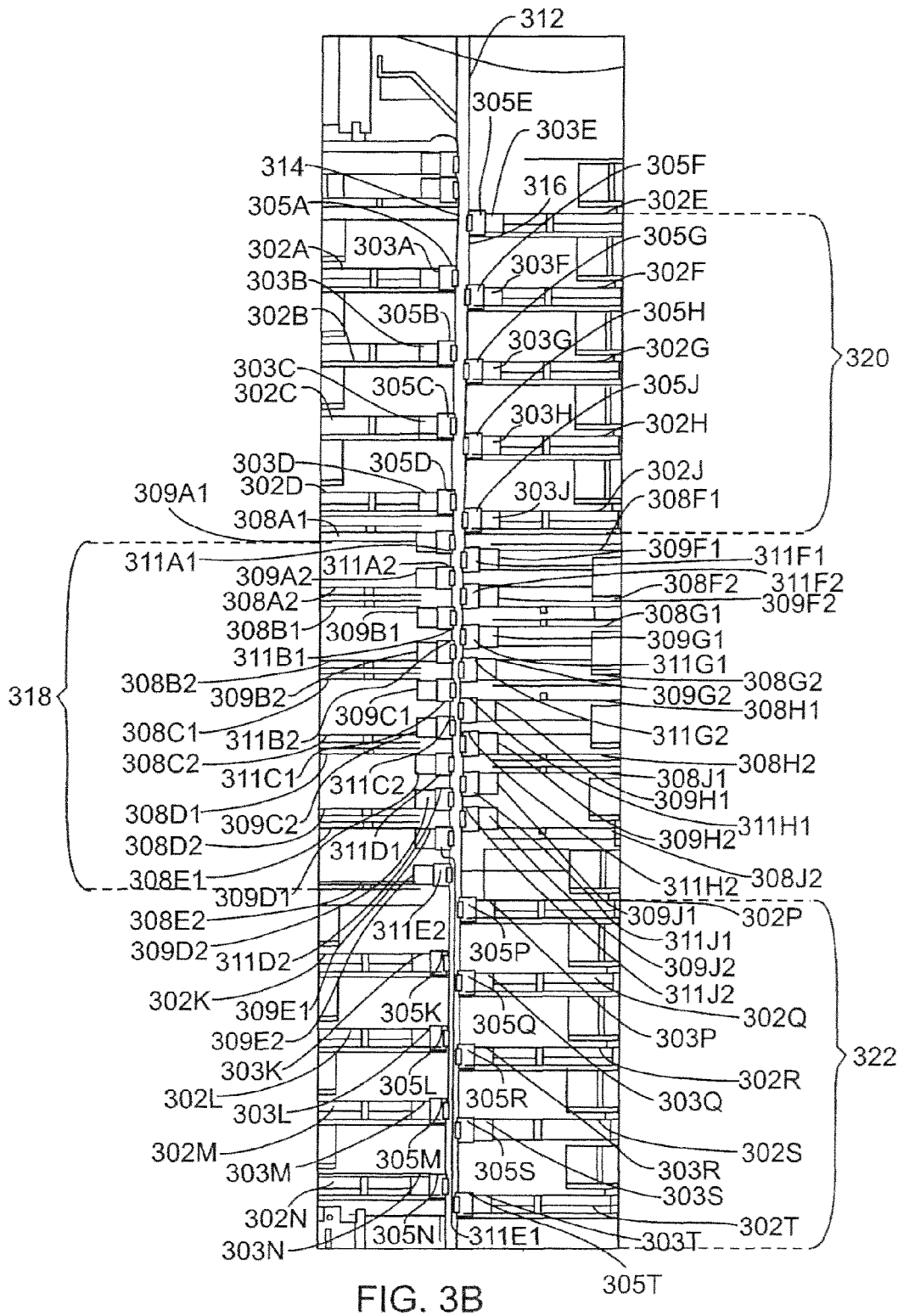
FIG. 3B shows an enlarged view of a portion of the switch system shown in FIG. 3A.

Now referring to FIGS. 3A and 3B, configuration of a switch system 300 with a plurality of leaf modules and a plurality of spine modules that are coupled using a midplane is described according to an embodiment of this disclosure. For example, in this embodiment, the switch system 300 is configured so as to minimize the length of the midplane, thereby minimizing the length of the signal lines in the midplane. FIG. 3A shows the cross sectional view of the switch 300 and FIG. 3B shows an enlarged view of a portion of the switch 300. Switch 300 may be similar to switch 200.

Referring to FIGS. 3A and 3B, the switch system 300 includes a midplane 312, a plurality of leaf modules 302A-302H, 302J-302N and 302P-302T and a plurality of spine modules 308A1, 308A2 through 308H1, 308H2 and 308J1 and 308J2. The midplane 312 couples the plurality of leaf modules 302A-302H and 302J-302T to the plurality of spine modules 308A1 through 308H2 and 308J1 and 308J2. The leaf modules 302A-302H, 302J-302N and 302P-302T each include a plurality of internal ports. The spine modules 308A1-308H2 and 308J1-308J2 each include a plurality of ports. The leaf modules 302A-302H, 302J-302N and 302P-302T may be similar to the first leaf modules 202A-202C described with reference to FIG. 2A. The spine modules 308A1-308H2 and 308J1 and 308J2 may be similar to the first spine modules 208A-208C described with reference to switch 200 and FIG. 2A.

A pair of spine modules 308A1-A2, 308B1-B2, 308C1-C2, 308D1-D2, 308E1-E2, 308F1-F2, 308G1-G2, 308H1-H2 and 308J1-J2 form a spine module pair 308A-308H and 308J respectively. Each of the spine modules 308A1-308H2 and 308J1-308J2 include a spine module connector. For example, the spine module 308A1 includes a spine module connector 309A1. Similarly, the spine module 308A2 includes a spine module connector 309A2.

In one embodiment, spine modules spine module pair, for example, the spine modules 308A1 and 308A2 are sandwiched together to form the spine module pair 308A, so as to minimize the height of the spine module pair 308A. The layout of some components of the spine modules of a spine module pair, for example, spine modules 308A1 and 308A2 may be arranged so as to minimize the total height of the spine module pair 308A. For example, the layout of some of the components that project, like components that include heat sinks may be arranged so that they are spaced apart and overlap with each other when the spine modules face each other and are sandwiched together to form the spine module pair. This arrangement can minimize the total height of the spine module pairs.

The spine module connectors 309A1-309H2 and 309J1-309J2 may each include a plurality of connector blocks, with sufficient conductive pins to transmit and receive data signals through the ports of the spine modules. The midplane 312 includes a plurality of first midplane connectors 311A1-311H2 and 311J1-311J2 that are configured to couple to corresponding spine card connectors 309A1-309H2 and 309J1-309J2 respectively.

For example, the spine module connector 309A1 couples to first midplane connector 311A1 and spine module connector 309H2 couples to first midplane connector 311E2. The first midplane connectors 311A1-311H2 and 311J1-311J2 include a plurality of conductors that couple the conductive pins of the spine module connectors 309A1-309H2 and 309J1-309J2 to the signal lines of the midplane 312, thereby coupling the ports of the spine modules 308A1-308H2 and 308J1-308J2 to the signal lines.

Each of the leaf modules 302A-302H, 302J-302N and 302P-302T include a leaf module connector 303A-303H, 303J-303N and 303P-303T respectively. The leaf module connector 303A-303H, 303J-303N and 303P-303T may each include a plurality of connector blocks, with sufficient conductive pins to transmit and receive data signals through the internal ports of the leaf modules.

The midplane 312 includes a plurality of second midplane connector 305A-305H, 305J-305N and 305P-305T that are configured to couple to corresponding leaf module connector 303A-303H, 303J-303N and 303P-303T respectively. For example, the leaf module connector 303A couples to second midplane connector 305A and leaf module connector 303F couples to second midplane connector 305F.

The second midplane connectors 305A-305H, 305J-305N and 305P-305T include a plurality of conductors that couple the conductive pins of the leaf module connectors 303A-303H, 303J-303N and 303P-303T to the signal lines of the midplane 312, thereby coupling the internal ports of the leaf modules 302A-302H, 302J-302N and 302P-302T to the signal lines.

Now, referring to FIG. 3B which is a partial enlarged view of the FIG. 3A, the configuration of the switch 300 will be explained in further detail. The midplane 312 includes a circuit board carrier 313, a first side 314 and a second side 316. The second side 316 is opposite to the first side 314. The length of the midplane 312 is defined along the line L-L.

The midplane 312 includes a mid portion 318, a top portion 320 above the mid portion 318 and a bottom portion 322 below the mid portion 318, along the length of the midplane 312. The plurality of conductors of the circuit board carrier 313 may disposed on a plurality of layers, for example, plurality of layers of a multi-layer printed circuit board. Some of the conductors of the circuit board carrier 313 form the signal lines for the midplane 312.

The second midplane connectors 305A-D are disposed on the midplane 312 about the first side 314, in the top portion 320. The conductors of the midplane connectors 305A-D are coupled to the signal lines of the midplane 312. The second midplane connectors 305E-H and 305J are disposed on the midplane 312 about the second side 316, in the top portion 320. The conductors of the second midplane connectors 305E-H and 305J are coupled to the signal lines of the midplane 312.

The leaf modules 302A-D are received about the first side 314 so as to couple the leaf module connectors 303A-303D with midplane connectors 305A-305D respectively. The leaf modules 302E-H and 302J are received about the second side 316 so as to couple the leaf module connectors 303E-303H and 303J with midplane connectors 305E-305H and 305J respectively.

The second midplane connectors 305K-305N are disposed on the midplane 312 about the first side 314, in the bottom portion 322. The conductors of the second midplane connectors 305K-N are coupled to the signal lines of the midplane 312. The second midplane connectors 305P-305T are disposed on the midplane 312 about the second side 316, in the bottom portion 322. The conductors of the second midplane connectors 305P-T are coupled to the signal lines of the midplane 312.

The leaf modules 302K-302N are received about the first side 314 so as to couple the leaf module connectors 303K-303N with midplane connectors 305K-305N respectively. The leaf modules 302S-302I are received about the second side 316 so as to couple the leaf module connectors 303P-303T with midplane connectors 305P-305T respectively.

The first midplane connectors 311A1-311E2 are disposed on the midplane 312 about the first side 314, in the middle portion 318. The conductors of the first midplane connectors 311A1-311E2 are coupled to the signal lines of the midplane 312. The spine modules 308A1-E2 are received about the first side 314 so as to couple the spine module connectors 309A1-309E2 with first midplane connectors 311A1-311E2 respectively. i.e. spine module connectors 309A1-309E1 couple with first midplane connectors 311A1-311E1 and spine module connectors 309A2-309E2 couple with second midplane connectors 311A2-311E2.

The first midplane connectors 311F1-311H2 and 311J1-311J2 are disposed on the midplane 312 about the second side 316, in the middle portion 318. The conductors of the first midplane connectors 311F1-311H2 and 311J1-311J2 are coupled to the signal lines of the midplane 312. The spine modules 308F1-308H2 and 308J1-308J2 are received about the second side 316 so as to couple the spine module connectors 309F1-309H2 and 309J1-309J2 with first midplane connectors 311F1-311H2 and 311J1-311J2 respectively. For example, the spine module connector 309F1 couples with first midplane connector 311F1 and spine module connector 309S2 couples with first midplane connector 311S2.

In one embodiment, the midplane 312 is configured such the first midplane connectors that couple spine module connectors of adjacent spine modules received about the first side and the second side are offset from each other along the length of the midplane. In one embodiment, the pair of spine module connectors of adjacent spine module pairs received about the first side and the second side are offset from each other along the length of the midplane.

For example, the spine module pair 308S is received about the first side 314 and the spine module pair 308G is received about the second side 316 and is adjacent to the spine module pair 308S. The first midplane connectors 311S1 and 311S2 are configured to couple to spine module connector 309S1 and 309S2 respectively. The first midplane connectors 311G1 and 311G2 are configured to couple to spine module connectors 309G1 and 309G2 respectively. The first midplane connectors 309B1, 309S2, 309G1 and 309 are offset from each other along the length of the midplane 312. More specifically, the first midplane connectors 309B1 and 309B2 alternate or interleave with first midplane connectors 309G1 and 309G2.

Similarly, spine module pair 308F is also received about the second side 316 and is adjacent to the spine module pair 308S. The first midplane connectors 311S1 and 311S2 are configured to couple to spine module connectors 309S1 and 309S2 respectively. The first midplane connectors 309S1 and 309S2 are offset from each other along the length of the midplane 312.

In yet another embodiment, the midplane 312 is configured such that the second midplane connectors that couple the leaf module connectors of adjacent leaf modules on the first side and the second side are offset from each other along the length of the midplane.

For example, the leaf module 302S is received about the first side 314 and the leaf module 302C is received about the second side 316 and is adjacent to the leaf module 302B. The second midplane connector 305B is configured to couple to leaf module connector 303B. The second midplane connector 305G is configured to couple to leaf module connector 303G. The second midplane connectors 305B and 305G are offset from each other along the length of the midplane 312.

As one skilled in the art appreciates, the first midplane connectors and the second midplane connectors may be similar in structure, function or both.

Now referring to FIGS. 3C, 3D and 3E, an exemplary embodiment of coupling the plurality of internal ports of the leaf modules to a port of the spine module using multiple layers of the printed circuit board carrier will be described.

As previously discussed with reference FIGS. 3A and 3B, the first side 314 of the midplane is configured to receive leaf modules 302A-302D and 302K-302N, and spine modules 308A1-308E2. As there are 18 leaf modules in system 300, each of the spine modules 308A1-308E2 will have at least 18 ports so that an internal port of each of the leaf module can be coupled to a port of all the spine modules so as to minimize the number of hops to three, as previously discussed.

Further, each of the leaf modules will have at least eighteen internal ports so that an internal port of the leaf module can be coupled to all of the eighteen spine modules, eight spine modules disposed about the first side and ten spine modules disposed about the second side. Although the description with reference to FIGS. 3C, 3D and 3E is directed towards coupling leaf modules and spine modules disposed about the first side, the teachings of this disclosure can be applied to couple leaf modules and spine modules disposed about the second side as well. Further, the teachings of this disclosure may be applied to couple leaf modules disposed about one side, for example, first side to a spine module disposed about another side, for example, second side.

Figure 3C:
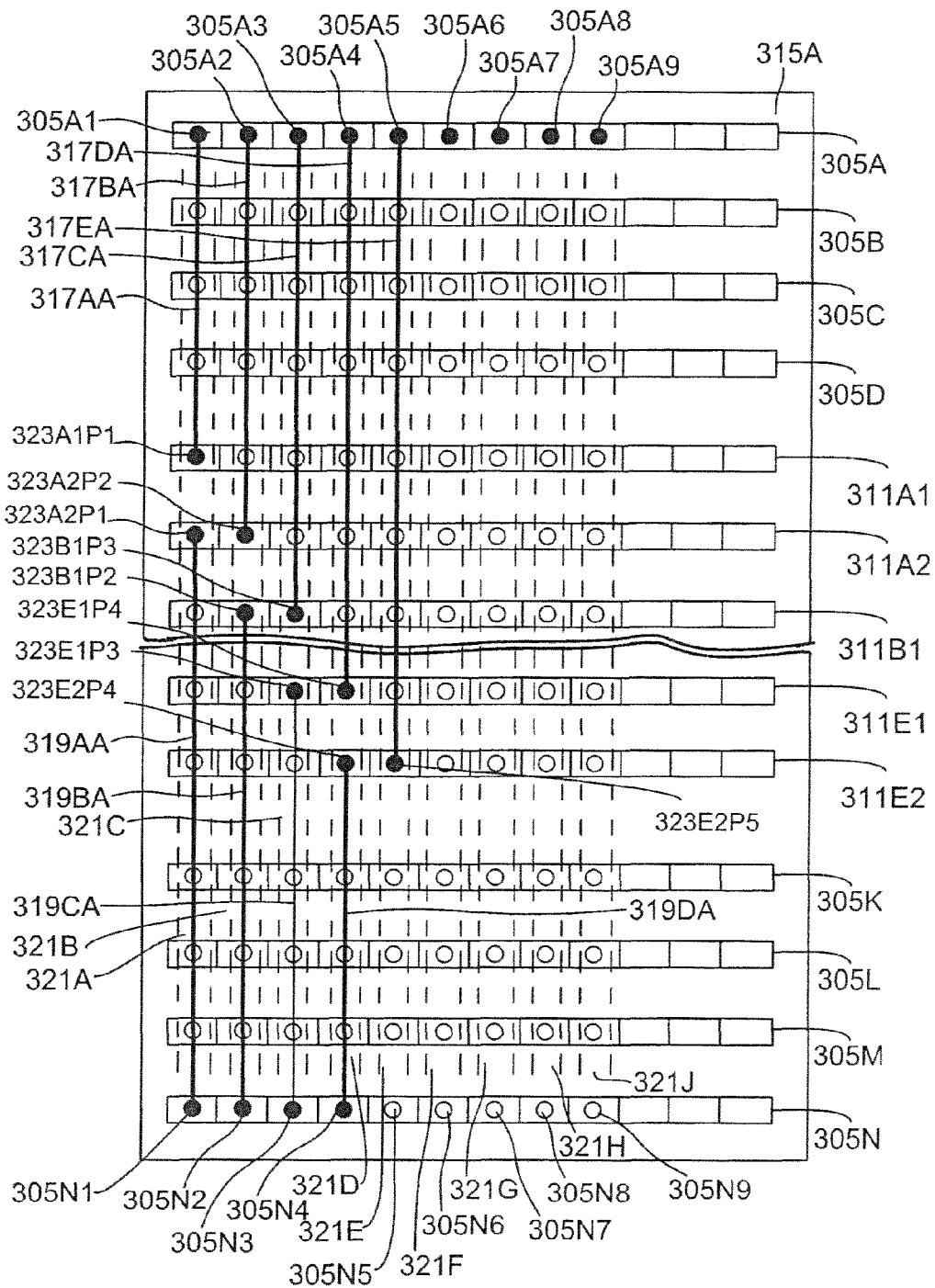
FIGS. 3C, 3D and 3E show an exemplary coupling between first midplane connectors and second midplane connectors to couple internal ports leaf modules to ports of spine modules.

FIG. 3C shows a layer 315A of the circuit board carrier 313 of the midplane 312. The layer 315A is configured to couple at least one internal port of leaf module 302A (not shown) to a port of the spine modules 308A1-308E2 (not shown) using pin blocks 305A1-305A8 of second midplane connector 305A. The layer 315 is also configured to couple all but one of the internal ports of leaf module 302N to a port of the spine modules 308A1-308E2 using pin blocks 305N1-305N3 of second midplane connector 305N.

The first midplane connectors 311A1, 311A2, 311B1, 311B2, 311C1, 311C2, 311D1, 311D2 and 311E1, 311E2 each include at least 18 pin blocks to couple 18 ports of the spine modules 308A1-308E2 to the signal lines of the midplane 312. For example, first midplane connector 311A1 includes pin blocks 323A1P1-323A1P18, to couple to 18 ports of the spine module 308A1. Similarly, first midplane connector 311S2 includes pin blocks 32352P1-323B2P18, to couple to 18 ports of the spine module 308B2. Only nine of the eighteen pin blocks of the first midplane connectors are shown in FIGS. 3C, 3D and 3E.

As one skilled in the art appreciates, each pin block 305A1-305A9 and pin blocks 323A1A1-323E2A18 may each have sufficient pins to couple an internal port of a leaf module to a port of a spine module, using the signal lines of the midplane. For example, in one embodiment, each pin block may have plurality of pins for transmission of signal and a plurality of pins for receipt of signals.

The coupling between two pin blocks are described in general and as one skilled in the art appreciates, pins for transmission of signal from a leaf module/spine module is coupled to pins for receipt signals to a spine module/leaf module respectively.

The layer 315A includes a plurality of first conductors 317AA-317EA and a plurality of second conductors 319AA-319DA. A plurality of channels 321A-321E define portions on the midplane 312 to dispose the plurality of first conductors and the plurality of second conductors on each of the layers.

The plurality channels 321A-321E are substantially parallel to each other. The plurality of channels 321A-321E generally extend from the top portion of the midplane 312 to the bottom portion of the midplane. In one embodiment, each channel 321A-321E is defined sufficiently wide to dispose a plurality of conductors required to couple an internal leaf module to a port of the spine module.

In one embodiment, a pair of first conductor and second conductor are configured such that the first conductor couples an internal port of a leaf module disposed in the top portion with a port of a spine module and the second conductor couples an internal port of a leaf module disposed in the bottom portion with a port of a spine module adjacent the spine module coupled by the first conductor. In yet another embodiment, the pair of first conductor and the second conductor are disposed in the same channel.

For example, the first conductor 317AA couples the pin block 305A1 of second midplane connector 305A to pin block 323A1P1 of first midplane connector 311A1 so as to couple an internal port of leaf module 302A to a port of the spine module 308A1. The second conductor 319A couples the pin block 305N1 of second midplane connector 305N to pin block 323A2P1 of first midplane connector 311A2 so as to couple an internal port of leaf module 302A to a port of the spine module 308A2. The first conductor 317A and second conductor 319A are both disposed in channel 321A.

Similarly, the first conductor 317DA couples the pin block 305A4 of second midplane connector 305A to pin block 323E1P4 of first midplane connector 311E1 so as to couple an internal port of leaf module 302A to a port of the spine module 308E1. The second conductor 319DA couples the pin block 305N4 of second midplane connector 305N to pin block 323E2P4 of first midplane connector 311E2 so as to couple an internal port of leaf module 302N to a port of the spine module 308E2. The first conductor 317DA and the second conductor 319DA are both disposed in channel 321D.

In one embodiment, a leaf module in the top portion and a leaf module in the bottom portion define a pair of leaf modules. In one embodiment, an internal port of one of the leaf module in the leaf module pair is coupled to a port of all the spine modules and internal ports of the other leaf module in the leaf module pair is coupled to a port all but one spine module on the same layer.

For example, leaf module 302A and 302N define a leaf module pair 302A/302N. The first conductors couple an internal port of leaf module 302A of leaf module pair 302A/302N to a port of all of the spine modules 308A1-308E2. For example, the first conductor 317EA couples the pin block 305A5 of second midplane connector 305A to pin block 323E2P5 of first midplane connector 311E2 so as to couple an internal port of leaf module 302A to a port of the spine module 308E2. However, the second conductors couple an internal port of leaf module 302N of leaf module pair 302A/302N to a port of the spine modules 308A2-308E2, but not 308A1. An internal port of leaf module 302N is coupled to port of spine module 308A1 in a different layer, as further described with reference to FIG. 3E, for example, using layer 315 E.

Figure 3D:
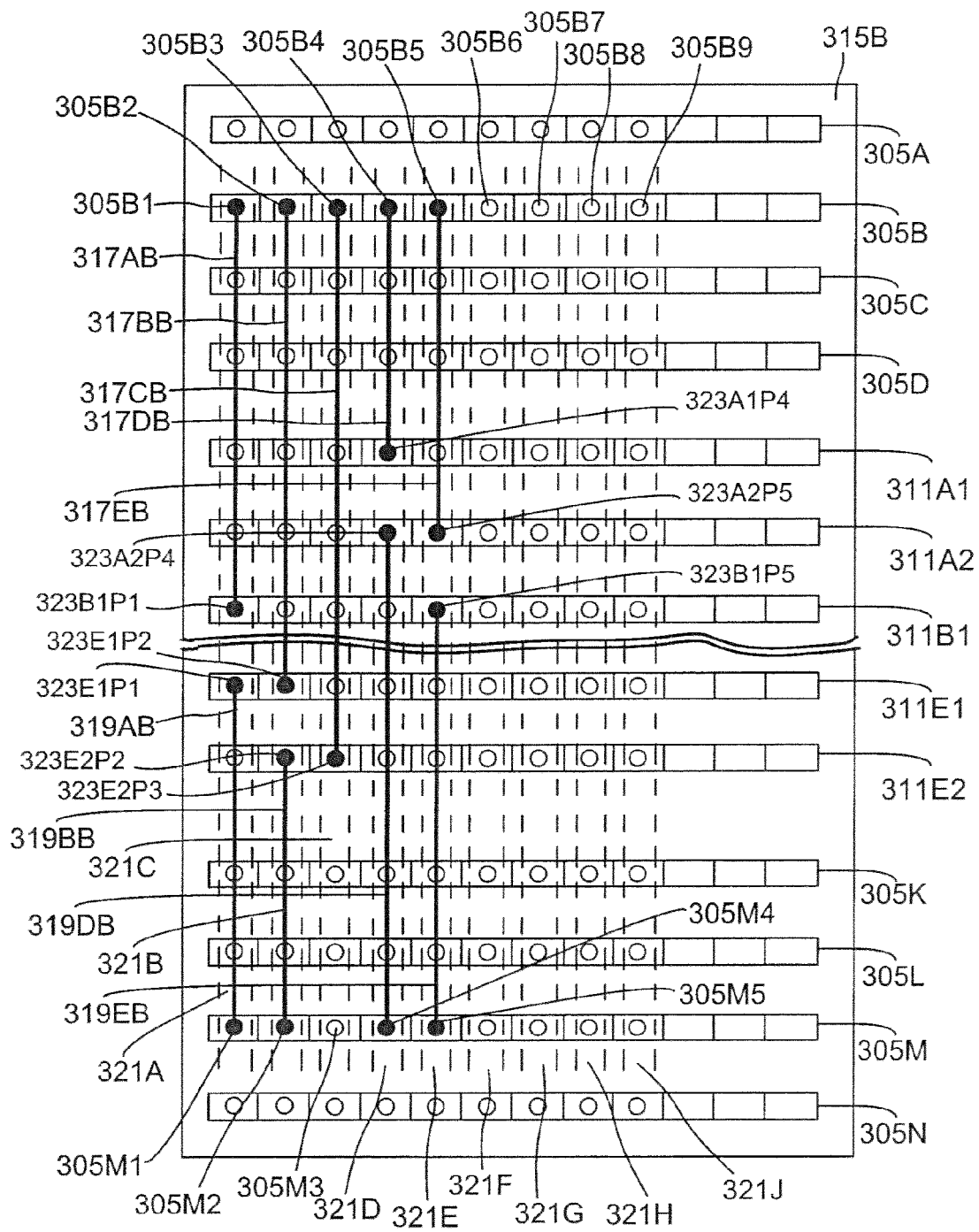

Now referring to FIG. 3D, another layer 315B of the circuit board carrier 313 of the midplane is disclosed. The layer 315B is configured to couple all of the internal ports of leaf module 302S to a port of the spine modules 308A1-308E2 using pins 305B1-305B5 of second midplane connector 305B. The layer 315B is also configured to couple an internal port of the leaf module 302M to a port of all of the spine modules, except one spine module. For example, the layer 315B is configured to couple an internal port of the leaf module 302M to a port of spine modules 308A2-308E2 using pins of second midplane connector 305M.

The layer 315B includes a plurality of first conductors and a plurality of second conductors. For example, the layer 315B includes a plurality of first conductors 317AB-317EB and a plurality of second conductors 319AB, 319BB, 319DB and 319E8.

In one embodiment, a pair of first conductor and second conductor are configured such that the first conductor couples an internal port of a leaf module disposed in the top portion with a port of a spine module and the second conductor couples an internal port of a leaf module disposed in the bottom portion with a port of a spine module adjacent the spine module coupled by the first conductor. In yet another embodiment, the pair of first conductor and the second conductor are disposed in the same channel.

For example, the first conductor 317DB couples the pin block 305B4 of second midplane connector 305B to pin block 323A1P4 of first midplane connector 311A1 so as to couple an internal port of leaf module 302B to a port of the spine module 308A1. The second conductor 319 DB couples the pin block 305M4 of second midplane connector 305M to pin block 323D1 of first midplane connector pair 311D1/D2 so as to couple an internal port of leaf module 302B to a port of the spine module 308A2. The first conductor 317D5 and second conductor 319DB are both disposed in channel 321D.

Similarly, the first conductor 31755 couples the pin block 30552 of second midplane connector 305B to pin block 323E1P1 of first midplane connector 311E1 so as to couple an internal port of leaf module 302B to a port of the spine module 308E1. The second conductor 31955 couples the pin block 305M2 of second midplane connector 305M to pin block 323F2 of first midplane connector 311E2 so as to couple an internal port of leaf module 302M to a port of the spine module 308E2. The first conductor 317BB and the second conductor 31955 are both disposed in channel 3215.

In one embodiment, a leaf module in the top portion and a leaf module in the bottom, portion define a pair of leaf modules. In one embodiment, an internal port of one of the leaf module in the leaf module pair is coupled to a port of all the spine modules and internal ports of the other leaf module in the leaf module pair is coupled to a port of all but one some module.

For example, leaf module 302B and 302M define a leaf module pair 302B/302M. The first conductors couple an internal port of leaf module 302B of leaf module pair 302B/302M to a port of all of the spine modules 308A1-308E2.

For example, the first conductor 31755 couples the pin block 305B2 of second midplane connector 3058 to pin block 323E1P1 of first midplane connector 311E1 so as to couple an internal port of leaf module 302B to a port of the spine module 308E2. The first conductor 31755 is disposed in channel 3218.

Similarly, the first conductor 317C8 couples the pin block 30583 of second midplane connector 3058 to pin block 323E283 of first midplane connector 31152 so as to couple an internal port of leaf module 3028 to a port of the spine module 308E2. The first conductor 317CB is disposed in channel 321C.

The second conductor 31955 is disposed in the same channel 321B as first conductor 317BB couples an internal port of leaf module 302M of leaf module pair 302B/302M to a port of the spine module 308E2, which is adjacent the spine module 308E1.

Similarly additional second conductors are disposed in the same channel as the first conductors to couple an internal port of leaf module 3025 to a port of a spine module adjacent the spine module to which the first conductor is coupled, except for first conductor 317CB, which couples to a port of spine module 311E2.

In this example, an internal port of leaf module 3025 is not coupled to a port of the spine module 308A1. An internal port of leaf module 302M is coupled to a port of spine module 308A in a different layer, as further described with reference to FIG. 3E, for example, using layer 315 E.

As one skilled in the art appreciates, internal ports of the remaining leaf module pairs, for example, leaf module pairs 305C/305L and 305D/305K can be coupled to a port of all of the spine modules as described above using one layer for each leaf module pair, with the exception of one internal port of a leaf module in the leaf module pair not coupled to a spine module. For example, an internal port of leaf modules 302L and 302K may not be coupled to the spine module 308A1.

Figure 3E:
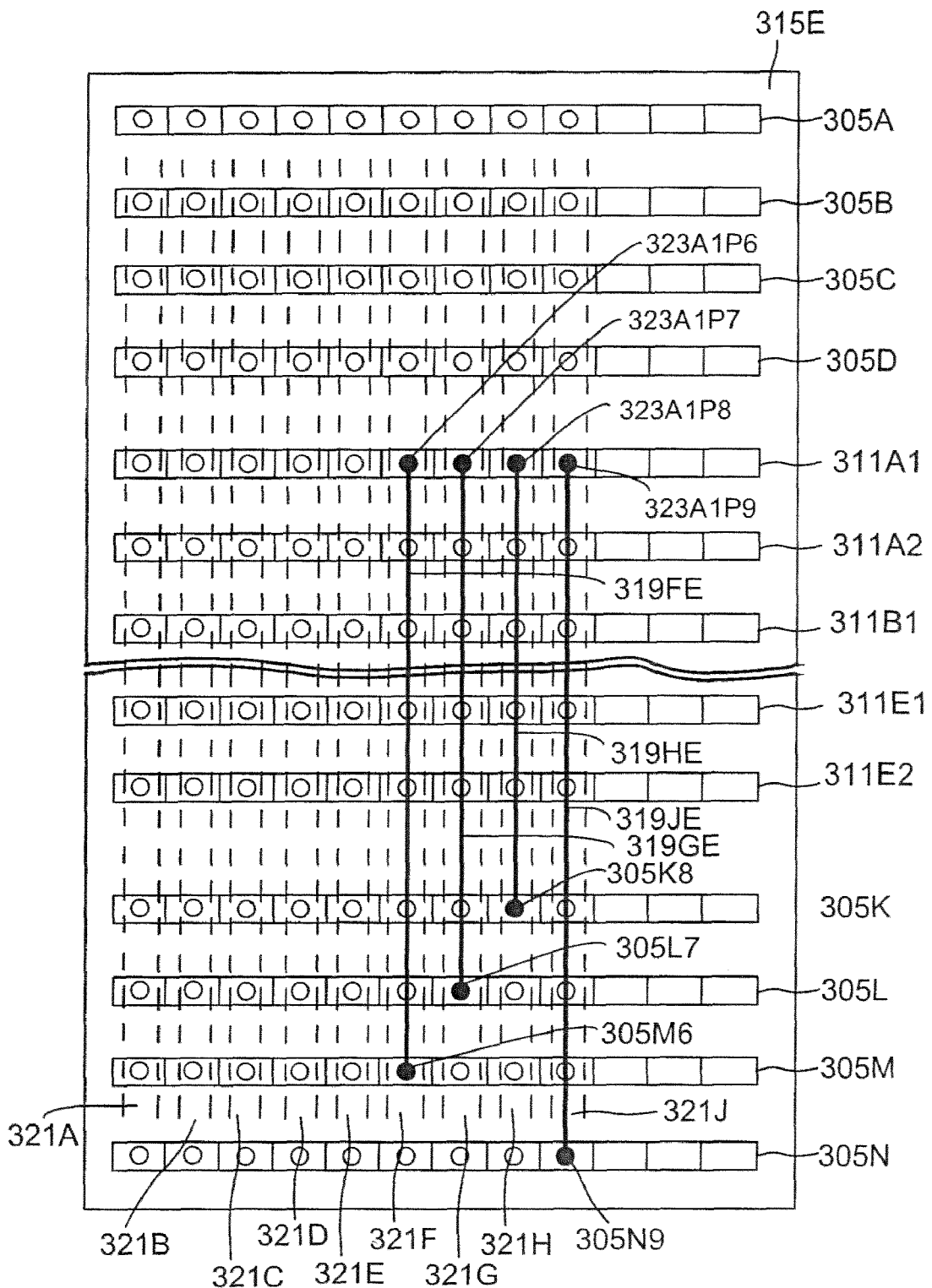

Now referring to FIG. 3E, another layer 3155 of the circuit board carrier 313 of the midplane is described. The layer 3155 is used to couple an internal port of leaf modules that were not coupled to a port of spine module in other layers. In the specific example, an internal port of leaf modules 302K-302N were not coupled to spine module 308A1.

The second conductor 319FE couples an internal port of leaf module 30251 through pin block 305M6 to port of spine module 308A1 through pin block 323A1P6. The second conductor 319FE is disposed in channel 321F.

The second conductor 319GE couples an internal port of leaf module 302L through pin block 30517 to a port of spine module 308A1 through pin block 323A1P7. The second conductor 319HE is disposed in channel 321G.

The second conductor 319HE couples an internal port of leaf module 302K through pin block 305K8 to port of spine module 308A1 through pin block 323A158. The second conductor 319HE is disposed in channel 321H.

The second conductor 319JE couples an internal port of leaf module 302N through pin block 305N9 to a port of spine module 308A1 through pin block 323A1P9. The second conductor 319JE is disposed in channel 321J.

As one skilled in the art appreciates, the teachings of this disclosure enables an internal port of four leaf module pairs disposed about the first side of the midplane 312 to be coupled to a port of spine modules 308A1-308E2 disposed about the first side using five layers, i.e. one layer more than the number of leaf module pairs. Further, the first midplane connector and the second midplane connector run substantially along the length of the midplane, there by minimizing the complexity of routing conductors on the printed circuit board.

In one embodiment, a channel may correspond to the space between adjacent plated through holes in the connector pinfield. For example, the plated through holes may be configured to receive the pins of the first midplane connectors and the second midplane connectors.

Figure 4A:
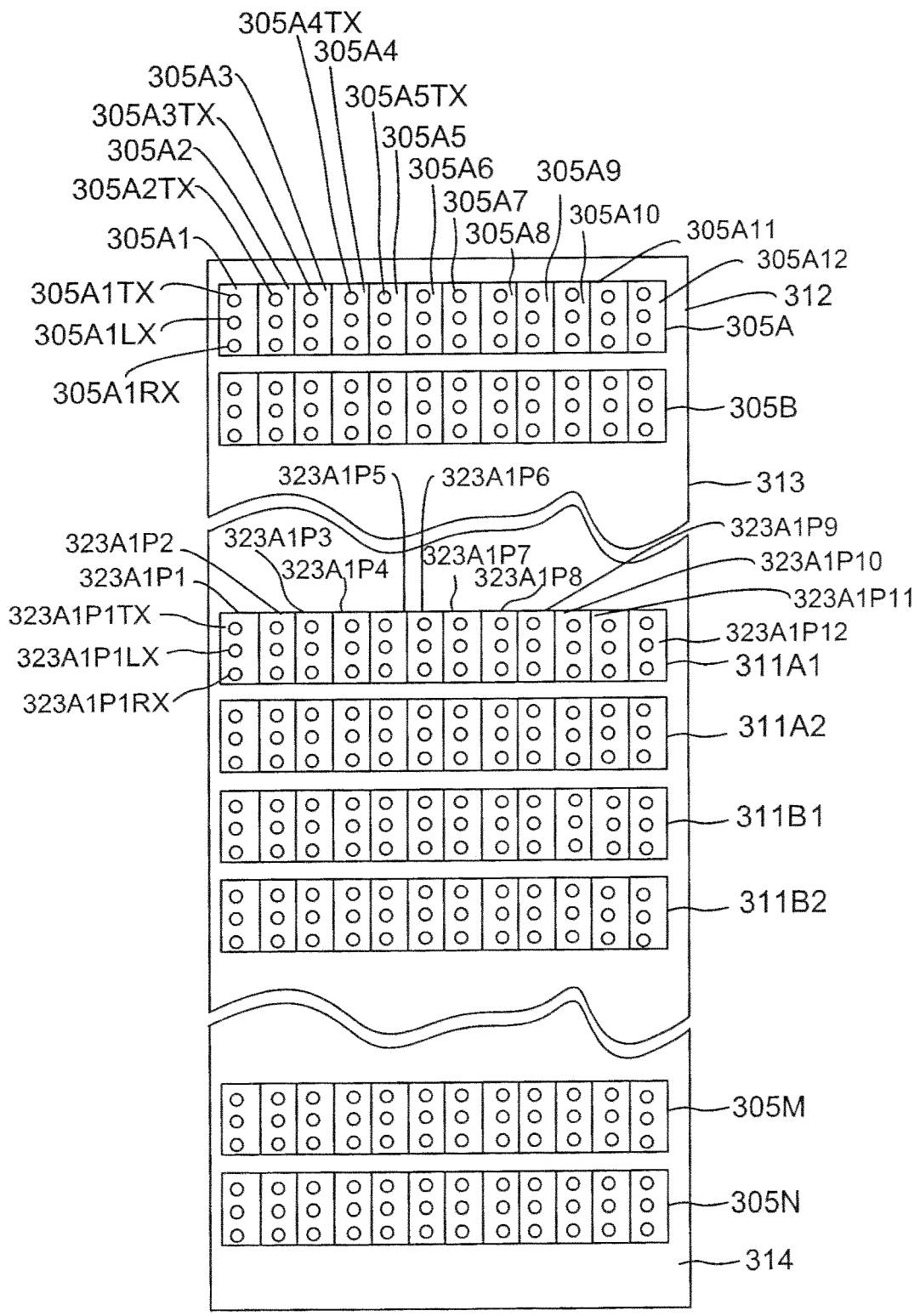
FIG. 4A shows partial view of the midplane switch system previously described with reference to FIGS. 3A and 3B.

An embodiment of the first midplane connectors and second midplane connectors will be described with reference to FIG. 4A. FIG. 4A shows partial view of the midplane 312 of system 300 previously described, showing only first midplane connectors A1, 321A2, 321B1 and 321B2 and only second midplane connectors 305A, 305B, 305N and 305M, both disposed on the first side circuit board carrier 313 on the first side 314. Only twelve of the eighteen pin blocks of the first midplane connectors are shown in FIG. 4A. Only twelve of the pin blocks of the second midplane connectors are shown in FIG. 4A.

The second midplane connector 305A includes a plurality of pins blocks, with each pin block 305A1-305A12 having sufficient pins to couple an internal port of a leaf module to a port of a spine module, using the signal lines of the midplane 312. For example, in one embodiment, each pin block 305A1-305A12 may have a plurality of pins for transmission of signal and a plurality of pins for receipt of signals.

For example, the pin block 305A1 includes transmit pins 305A1TX and receive pins 305A1RX. The pin blocks 305A1-305A12 may also include a plurality of pins for transmission and receipt of other signals, for example, signals of low to moderate speeds, like control signals. For example, the pin block 305A1 may include a plurality of third pins 305A1LX for transmission and receipt of other signals.

In one embodiment, the transmit pins and the receive pins are physically separated by the plurality of third pins. For example, the transmit pins 305A1TX and the receive pins 305A1RX are separated by third pins 305A1LX. Separating the transmit pins and the receive pins can minimize crosstalk between transmit signals and receive signals.

The first midplane connector 311A1 includes plurality of pins, with each pin block 323A1P1-323A1P12 having sufficient pins to couple a port of a some module to an internal port of a leaf module, using the signal lines of the midplane 312. For example, in one embodiment, each pin block 323A1P1-323A1P12 may have a plurality of pins for transmission of signal and plurality of pins for receipt of signals.

For example, the pin block 323A1P1 includes transmit pins 323A1P1TX and receive pins 323A1P1RX. The transmit pins of first midplane connector are configured to be coupled to receive pins of second midplane connector. The receive pins of first midplane connector are configured to be coupled to transmit pins of second midplane connector.

The pin blocks 323A1P-323A1P12 may also include a plurality of pins for transmission or receipt of other signals of low to moderate speeds, for example, control signals. For example, the pin block 323A1P1 may include a plurality of third pins 323A1P1LX.

In one embodiment, the transmit pins and the receive pins are physically separated by the plurality of third pins. For example, the transmit pins 323A1P1TX and the receive pins 323A1P1RX are separated by third pins 323A1P1LX. Separating the transmit pins and the receive pins can minimize crosstalk between transmit signals and receive signals.

Other first midplane connectors and second midplane connectors may be similarly constructed as described with reference to first midplane connector 311A1 and second midplane connector 305A.

Exemplary coupling between a transmit pin and a receive pin will be illustrated with reference to FIG. 4B.

Now, referring to FIG. 4B the coupling of the transmit pins 305A1TX-305A5TX of pin blocks 30551-305A5 to layers 315A will be described. For example, transmit pin 305A1TX is coupled to the signal lines on layer 315A using via 305A1V. For example, the via 305A1V may be configured to couple to first conductor 317AA. The first conductor 317AA is disposed in channel 321A on layer 315A. As previously described with reference to FIG. 3C, the first conductor 317AA couples to pin block 323A1P1 of first midplane connector 311A1. The first conductor 317AA couples to the receive pin 323A1P1RX as will be further described with reference to FIG. 4C.

Similarly, transmit pins 305A2TX-305A5Tx, couple to first conductors 317BA-317EA, as previously discussed with reference to FIG. 3C. The first conductors 317BA-317EA are disposed in channels 321B-321E respectively.

Now, an exemplary coupling of a first conductor and a second conductor to a receive pin of the first midplane connector will be described with reference to FIG. 4C. FIG. 4C shows exemplary coupling of first conductors 317AA and 317DB and second conductor 319FF to the receive pins of first midplane connector 311A1.

As previously discussed with reference to FIG. 3C, first conductor 317AA couples to pin block 323A1P1 of first midplane connector 311A1. The first conductor 317AA is disposed on layer 315A and channel 321A. Now referring to FIG. 45, the first conductor 317AA is coupled to the receive pin 323A1P1RX of pin block 323A1P1. The via 323A1V is configured to couple first conductor 317AA with receive pin 323A1P1RX. The first conductor 317AA is disposed in channel 321A on layer 315A.

Similarly, as discussed with FIG. 3D, first conductor 317DB couples to pin block 323A1P4 of first midplane connector 311A1. The first conductor 317DB is disposed on layer 315B and channel 321D. Now referring to FIG. 4C, the first conductor 317DB is coupled to the receive pin 323A1P4RX of pin block 323A1P4. The via 323A4V is configured to couple first conductor 317DB with receive pin 323A1P4RX. The first conductor 317DB is disposed in channel 321D on layer 315B.

Similarly, as discussed with FIG. 3E, second conductor 319FE couples to pin block 323A1P6 of first midplane connector 311A1. The second conductor 319FE is disposed on layer 315E and channel 321F. Now referring to FIG. 4C, the second conductor 319FE is coupled to the receive pin 323A1P6RX of pin block 323A1P6. The via 323A6V is configured to couple second conductor 317FE with receive pin 323A1P6RX. The second conductor 317FE is disposed in channel 321F on layer 315E.

As one skilled in the art appreciates, coupling and routing configurations described with reference to FIGS. 4B and 4C may be applied to couple transmit and receive pins of pin blocks of second midplane connectors 305A-D and 305K-305N to corresponding receive and transmit pins of pin blocks of first midplane connectors 323A1-323E2.

Figure 4B:
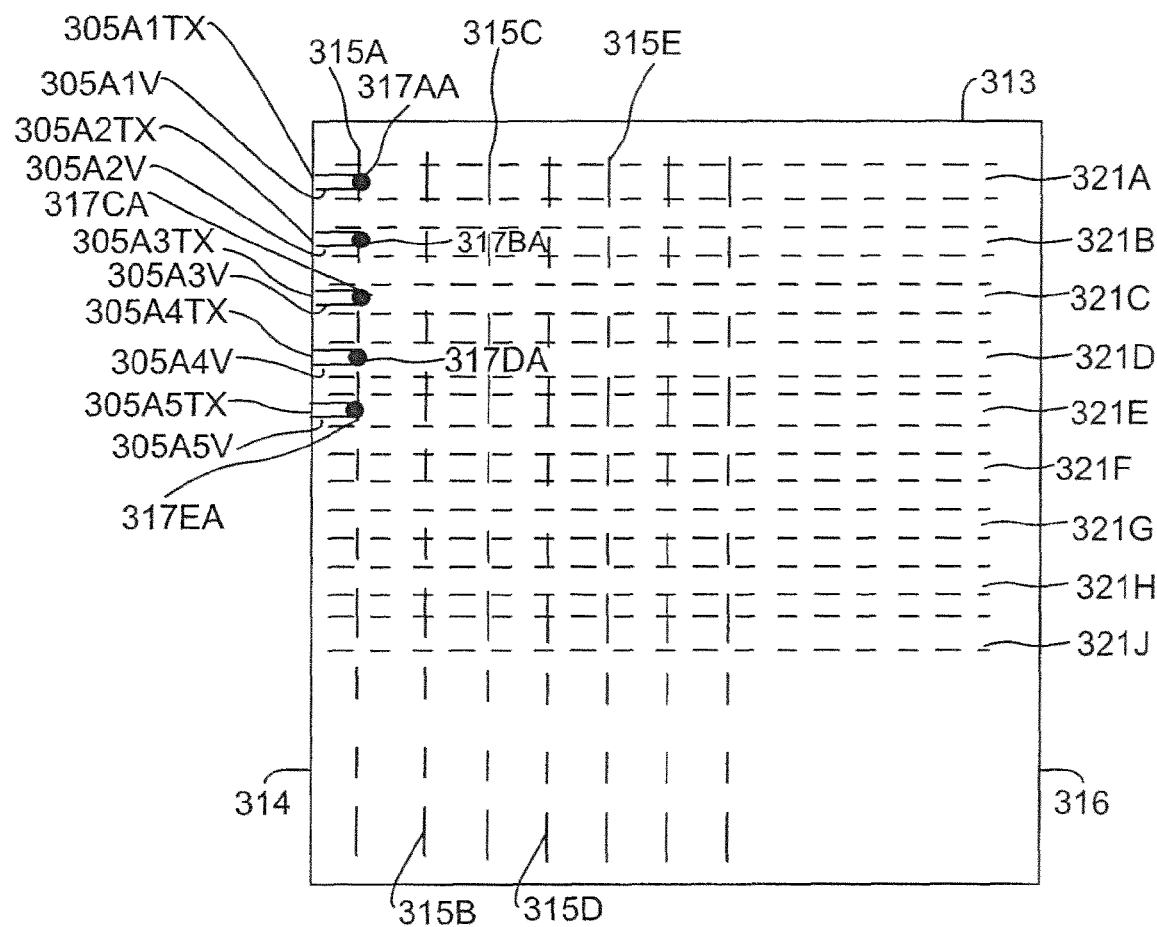
FIGS. 4B and 4C show an exemplary coupling between first midplane connectors and second midplane connectors to couple internal ports of leaf modules to ports of spine modules.
Figure 4C:
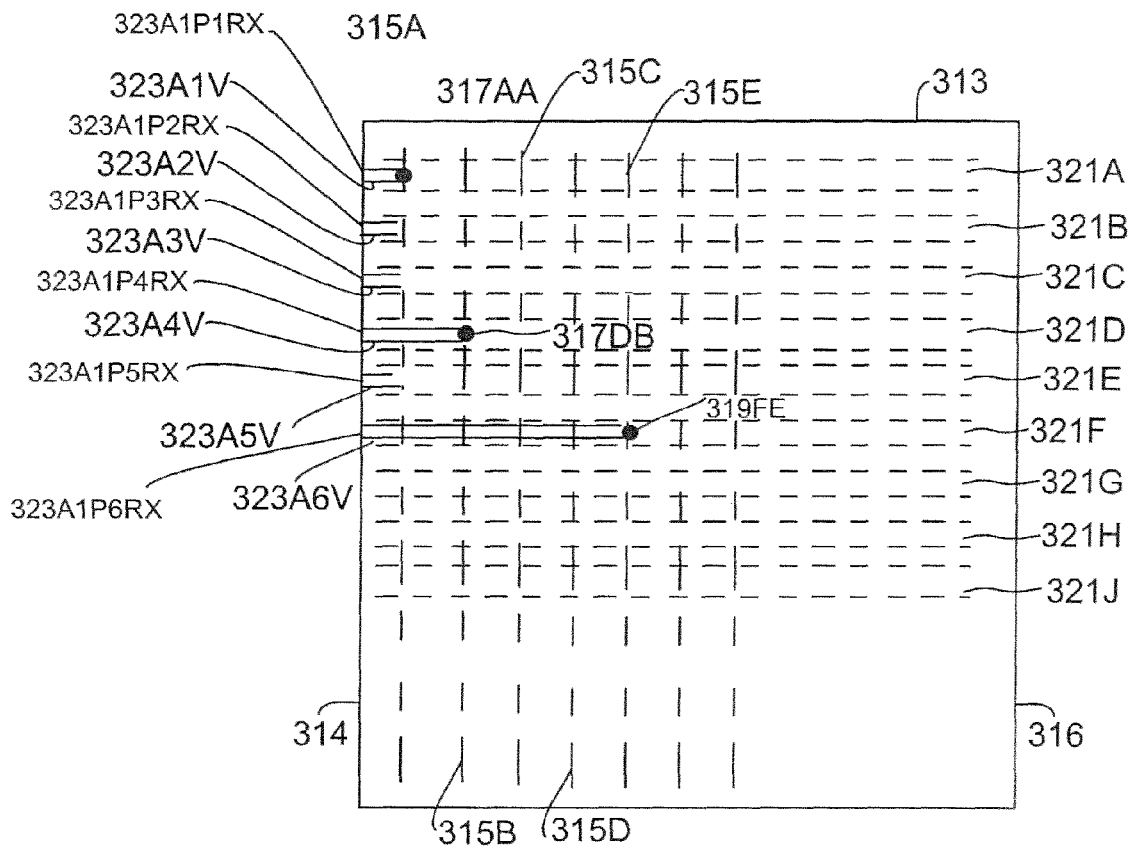

Although the description with reference to FIGS. 4A, 4B and 4C is directed towards coupling leaf modules and spine modules disposed about the first side, the teachings of this disclosure can be applied to couple leaf modules and spine modules disposed about the second side as well. Further, the teachings of this disclosure may be applied to couple leaf modules disposed about one side, for example, first side to a spine module disposed about another side, for example, second side.

Yet another embodiment of coupling leaf modules on one side to spine modules on the other side of the midplane is described with reference to FIGS. 5A, 5B and 5C.

Figure 5A:
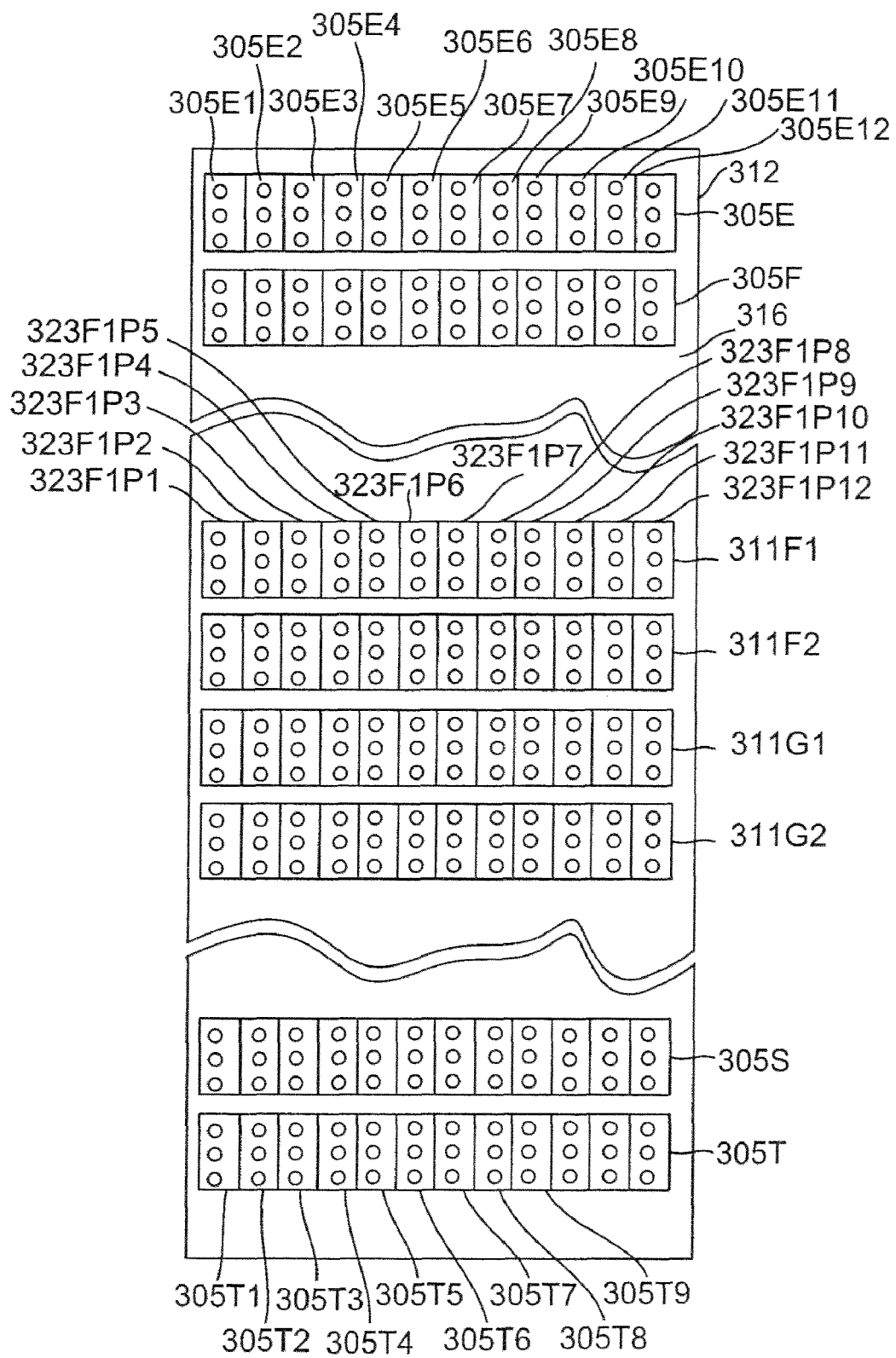
FIG. 5A shows partial view of the midplane of switch system previously described with reference to FIGS. 3A and 3B.

Now referring to FIG. 5A, partial view of the midplane 312 of system 300 as previously described is shown with first midplane connectors 311F1, 311F2, 311G1 and 311G2 and only second midplane connectors 305E, 305F, 305S and 305T, both disposed on the circuit board carrier 313 on the second side 316. Only twelve of the eighteen pin blocks of the first midplane connectors are shown in FIG. 5A. For example, pin blocks 323F1P1-323F1P12 for first midplane connector 311F1 is shown. Also, only 12 of the eighteen pin blocks of the second midplane connectors are shown in FIG. 5A. For example, pin blocks 305E1-305E12 is shown.

In one embodiment, the first midplane connectors disposed on the second side are similar to first midplane connectors disposed on the first side, as previously described. In one embodiment, the second midplane connectors disposed on the second side are similar to second midplane connectors disposed on the first side, as previously described.

Figure 5B:
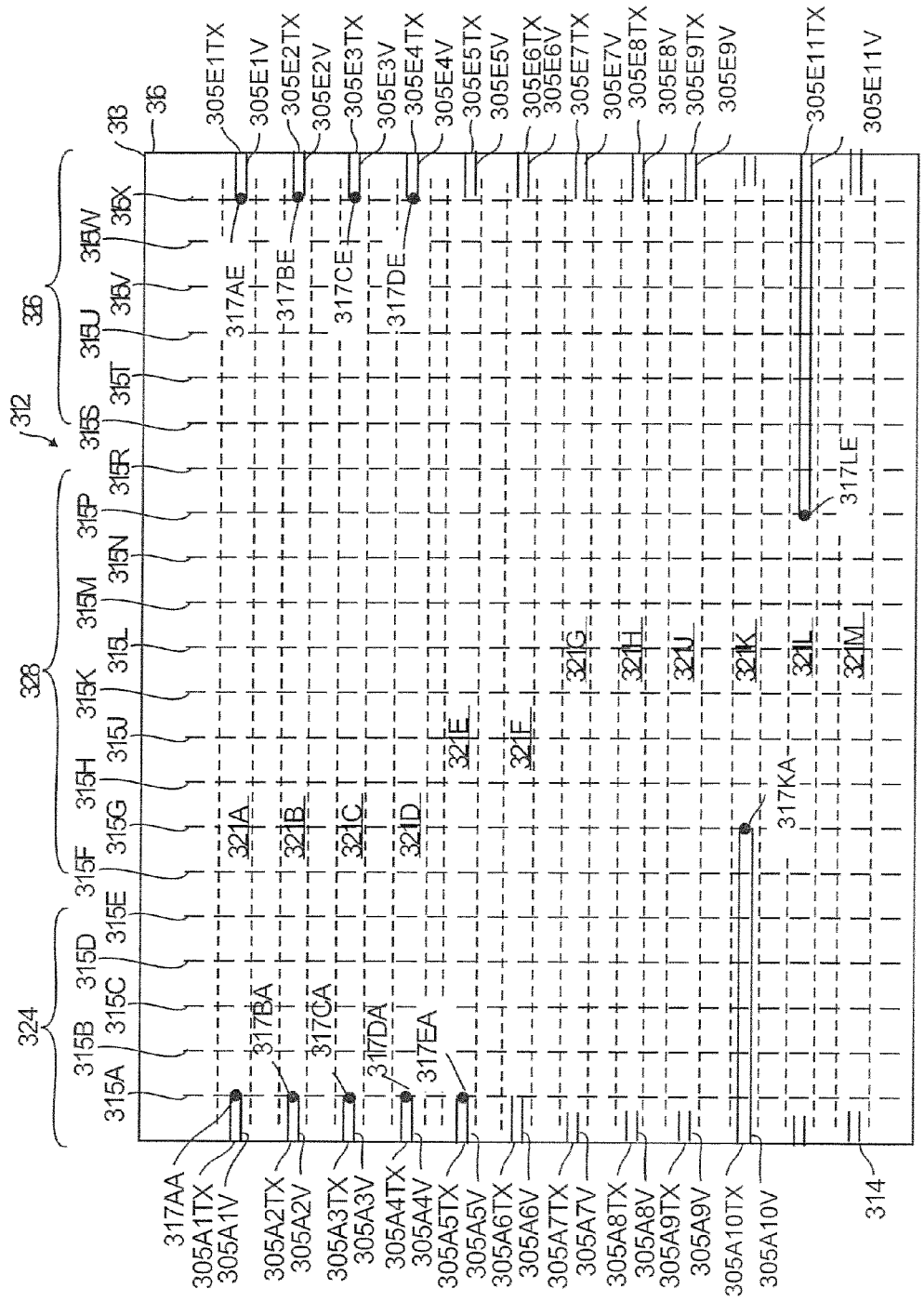
FIGS. 5B and 5C show an exemplary coupling between first midplane connectors disposed on both sides and second midplane connectors disposed on both sides, to couple internal ports of leaf modules to ports of spine modules.

Referring to FIG. 5B, the midplane 312 includes a plurality of layer 315X. As previously discussed, a plurality of conductors, for example, a plurality of first conductor and a plurality of second conductor may be disposed on the plurality of layer 315A-315X. The plurality of layers are grouped into a plurality of first layers 324, a plurality of second layers 326 and a plurality of third layers 328. The plurality of first layers 324 are closer to the first side 314. The plurality of second layers 326 are closer to the second side 316. The plurality of third layers 328 are disposed between the plurality of first layer 324 and the plurality of second layer 326.

For example, layers 315A-315F may be part of the plurality of first layer 324, layers 315S-315W may be part of the plurality of second layer 326 and layers 315F-315R may be part of the plurality of third layer 326.

In one embodiment, the internal ports of the leaf modules disposed on the first side are coupled to a port of the spine module disposed on the first side using conductors disposed on the plurality of first layer 324.

In one embodiment, the internal ports of the leaf modules disposed on the second side are coupled to a port of the spine module disposed on the second side using conductors disposed on the plurality of second layer 326.

Exemplary coupling of an internal port of a leaf module disposed on one side, for example, first side to a port of a spine module disposed on the same side, for example, first side has been previously described with reference to FIGS. 3C, 3D, 3E, 4A, 4B and 4C. Similarly, internal ports of leaf modules disposed on the second side may be coupled to the ports of spine modules disposed on the second side.

Now referring to FIG. 5B, exemplary coupling of a port of leaf modules 302A and 302E will be described. For example, as previously discussed with reference to FIGS. 4B and 3C, the transmit pins 305A1Tx, 305A2TX, 305A3TX, 305A4TX and 305A5TX are coupled to one of the layers of the first layers 324, for example, layer 315A. Each of the transmit pins 305A1TX, 305A2TX, 305A3TX, 305A4TX and 305A5Tx are coupled to a port of a spine module disposed on the first side, for example, spine modules 308A1, 308A2, 308B2, 308E1 and 308E2.

Similarly, the transmit pins 305E1TX, 305E2TX, 305E3TX and 305E4TX are coupled to one of the layers of the second layers 326, for example, layer 315X.

For example, transmit pin 305E1TX is coupled to first conductor 317AE disposed about layer 315X using via 305EIV. The first conductor 317AE is disposed in channel 321A. Similarly, transmit pin 305E2TX is coupled to first conductor 317BE disposed about layer 315X using via 305E2V. The first conductor 317BE is disposed in channel 321B. Transmit pin 305E3TX is coupled to first conductor 317CE disposed about layer 315X using via 305E3V. The first conductor 317CE is disposed in channel 3120. Transmit pin 305E4TX is coupled to first conductor 317DE disposed about layer 315X using via 305E4V. The first conductor 317DE is disposed in channel 312D.

Each of the transmit pins 305E1TX, 305E2TX, 305E3TX and 305E4TX are coupled to a receive port of a spine module disposed on the second side, for example, a receive port of spine modules 308F1-308J2, using first conductors 317AE, 3175E, 317CE and 3170E. As an example, transmit port 305E1TX may be coupled to receive port 323F1RX of first midplane connector 32351, using first conductor 317AE.

In one embodiment, the input ports of the leaf module disposed on one side, for example first side are coupled to a port of the spine module disposed on the second side, using conductors disposed on the plurality of third layers.

For example, transmit pin 305A10TX-need to be coupled to a port of a spine module disposed on the second side 316 of the midplane 312. Similarly, transmit pins 305E11TX need to be coupled to a port of a spine module disposed on the first side 314 of the midplane 312. According to an embodiment of this disclosure, one or more of the layers of the plurality of third layer 328 will be used to couple the transmit pins 305A10TX to a receive pin of one of the first midplane connectors 311F1-311H2 and 311J1-311J2 disposed about the second side. Similarly, one or more of the layers of the plurality of third layers 328 will be used to couple the transmit pin 305E11TX to a receive pin of one of the first midplane connectors 311A1-311E2 disposed about the first side.

For example, transmit pin 305A10TX is coupled to first conductor 317KA on one of the plurality of third layers, for example, layer 315G using via 305A10V. The first conductor 317KA is disposed in channel 321K. The first conductor 317KA is configured to couple to a receive pin of one of the first midplane connectors, for example, first midplane connector 323A1.

Now referring to second midplane connector 305E disposed about the second side 316, transmit pin 305E11TX is coupled to first conductor 317LE disposed about one of the plurality ef third layers, for example, layer 3152 using via 305E5V. The first conductor 317LE is disposed in channel 321L. The first conductor 317LE is configured to couple to a receive pin of one of the first midplane connectors, for example, first midplane connector 323A1.

Now, referring to FIG. 5C, exemplary coupling of a port of spine module 308A1 disposed on the first side to internal port of leaf module 302E disposed on the second side and coupling of a port of spine module 308F1 disposed on the second side with internal port of leaf module 302A disposed on the first side will be described.

For example, as previously described, the transmit pin 305A10TX of the second midplane connector 305A1 is coupled to conductor 317KA on layer 315G, and disposed in channel 321K. The receive pin 323F1P10Rx of first midplane connector 311F1 is coupled to first conductor 317KA disposed on layer 315G using via 323F10V.

Similarly, as previously described, the transmit pin 305E11TX of the second midplane connector 305E is coupled to conductor 317LE on layer 315P, and disposed in channel 321L. The receive pin 323A1P11RX of first midplane connector 311A1 is coupled to first conductor 317LE disposed on layer 315P using via 323A11V.

Figure 5C:
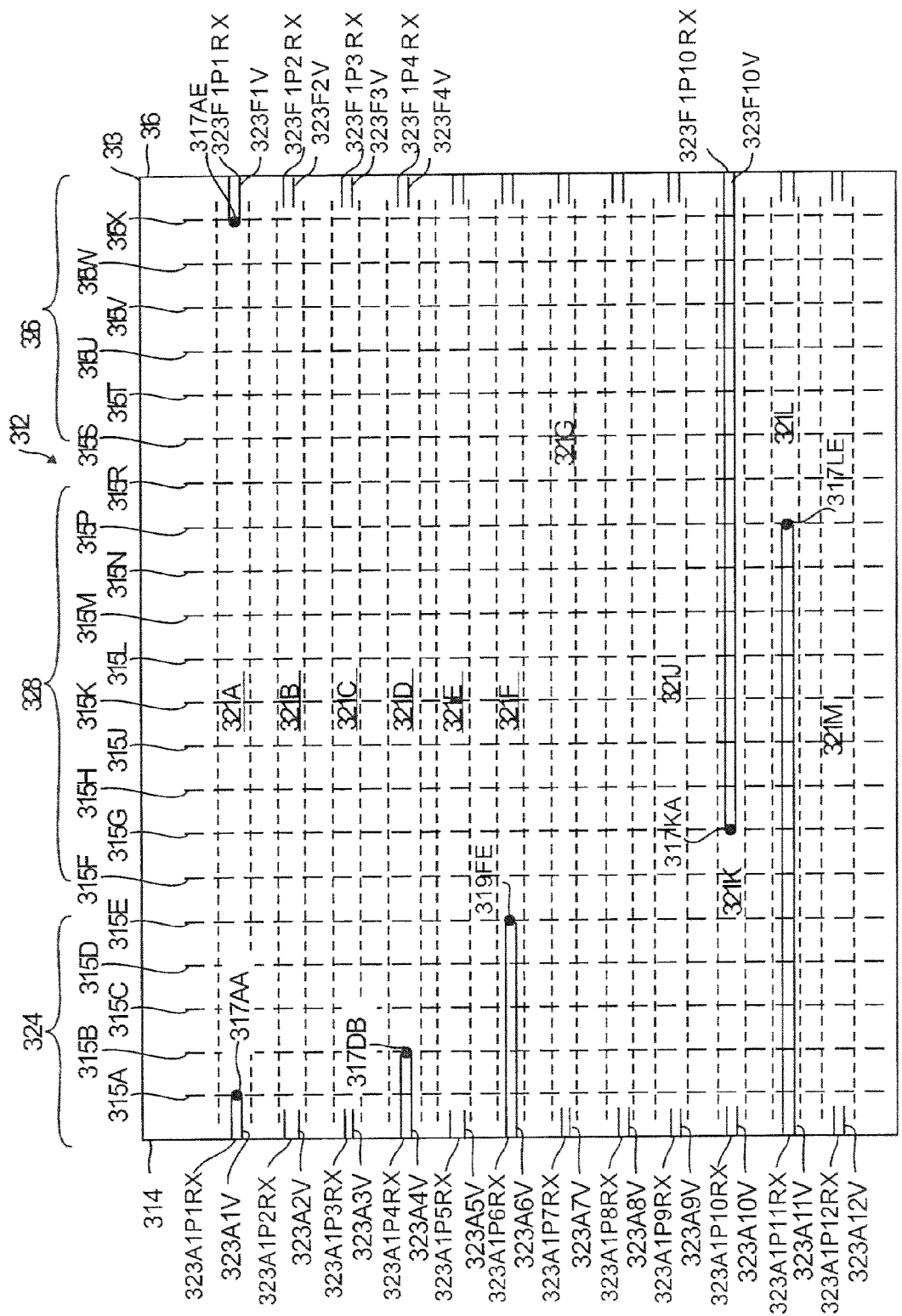

In addition, FIG. 5C shows first conductor 317AA disposed on layer 315A is coupled to receive pin 323A1P1RX of the first midplane connector 311A1, using via 323A1V. As previously discussed with reference to FIGS. 3C and 4B, first conductor 317AA couples to transmit pin 305A1TX of second midplane connector 305A.

Similarly, first conductor 317DB disposed on layer 315B is coupled to receive pin 323A1P4RX of the first midplane connector 311A1, using via 323A4V. As previously discussed with reference to FIGS. 3D and 4C, first conductor 317DB couples to transmit pin 305B2TX of second midplane connector 305B.

Similarly, first conductor 317AE disposed on layer 315X is coupled to receive pin 323FIPIRX of the first midplane connector 311F1, using via 323F1V. As previously discussed with reference to FIG. 5B, first conductor 317AE couples to transmit pin 305E1TX of second midplane connector 305E.

As one skilled in the art appreciates, coupling of leaf modules on one side to a spine module on the other side may be done using pairs of first conductor and second conductor disposed in the same channel, on the plurality of third layers. For example, teachings of coupling using first conductors and second conductors as previously described with reference to FIGS. 3C, 3D and 35 may be adapted by one skilled in the art.

For example, a leaf module disposed about the too portion on one side and a leaf module disposed about the bottom portion on the other side may form a pair of leaf modules that are coupled using a pair of first conductor and a second conductor disposed on the same layer and same channel. For example, the first conductor of the pair may couple to a spine module on one side and the second conductor of the pair may couple to a spine module on the other side, which is adjacent but on the opposite side.

As an example, a first conductor would couple internal port of leaf module 302A disposed about first side to a port of spine module 311F1 disposed about the second side and the second conductor would couple internal port of leaf module 305T disposed about the second side to a port of spine module 311A2 disposed about the first side. Both first conductor and second conductor may be disposed on the same layer and same channel. For example, the layer may be one of the plurality of third layers. In this example, spine module 311A2 is adjacent, but on opposite side of spine module 311F1.

Figure 6:
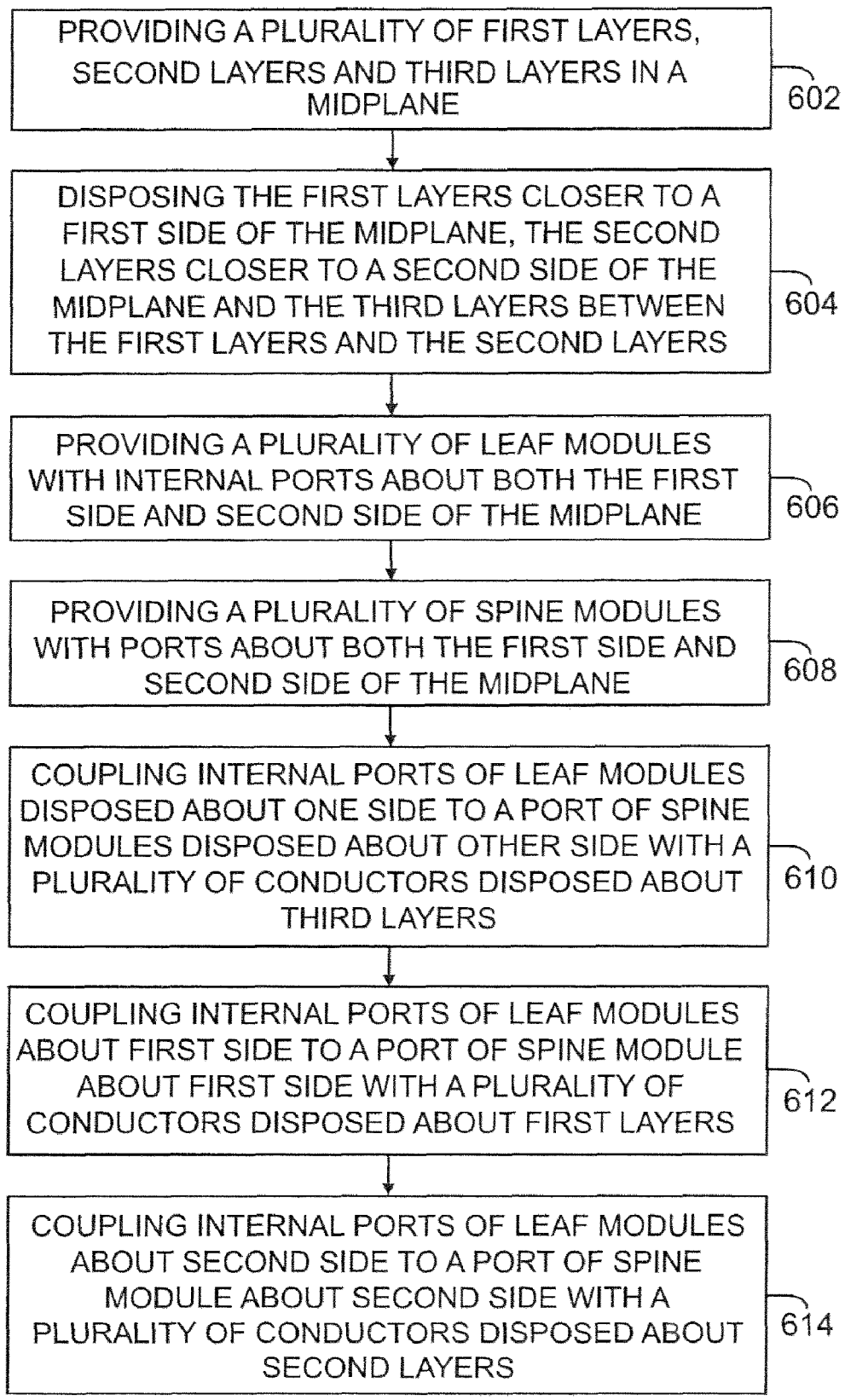
FIG. 6 show process flow diagram to configure a switch system, according to an embodiment of this disclosure.

Now referring to FIG. 6, a method of configuring a switch system is disclosed. In step 602, a midplane with a plurality of first layers, plurality of second layers and a plurality of third layers is provided.

In step 604, the plurality of first layers are disposed closer to the first side of the midplane. The plurality of second layers are disposed closer to the second side of the midplane. The plurality of third layers are disposed between the plurality of first layers and the plurality of second layers.

In step 606, a plurality of leaf modules with a plurality of internal ports is provided. The plurality of leaf modules are provided about both the first side and the second side of the midplane.

In step 608, a plurality of spine modules with a plurality of ports is provided. The plurality of spine modules are provided about both the first side and the second side of the midplane.

In step 610, the internal ports of leaf modules disposed about one side are coupled to a port of spine modules disposed about the other side with a plurality of conductors disposed about the plurality of third layer.

In step 612, the internal ports of leaf modules disposed about the first side are coupled to a port of spine modules disposed about the first side with a plurality of conductors disposed about the plurality of first layer.

In step 614, the internal ports of leaf modules disposed about the second side are coupled to a port of spine modules disposed about the second side with a plurality of conductors disposed about the plurality of second layer.

As one skilled in the art appreciates, by using the first layers and the second layers to couple internal ports of leaf modules to a port of the spine modules both disposed on the same side and using the third layer to couple internal ports of a leaf module disposed on one side to a port of a spine module on the other side, may reduce the number of layers required to couple internal ports of leaf modules to ports of modules.

By using a midplane 312 to receive leaf modules and spine modules on both the first side 314 and second side 316, the length of the midplane 312 can be reduced to about half the length of a backplane that receives leaf modules and the spine modules on only one side.

By positioning the spine modules in the mid portion and the leaf modules in the top portion and the bottom portion, the length of the signal lines in the midplane 312 that is needed to couple an internal port of a leaf module to a port of the spine module is minimized. For example, as the spine modules are located in the mid portion of the midplane 312, the length of the signal lines may be reduced on an average, to about half the length of the midplane 312.

By having two spine modules per spine module pair and interleaving the spine module connectors of adjacent spine module pairs, the length of the midplane 312 required to couple a plurality of spine modules to the midplane is reduced. Further, creating a spine module pairs by sandwiching two spine modules reduces the height of the spine module.

Based upon this disclosure, one or more of the benefits described above may be realized by one skilled in the art.

As one skilled in the art appreciates, the first midplane connectors and the second midplane connectors may be similar in structure, function or both.

Although the present disclosure has been described with reference to specific embodiments, these embodiments are illustrative only and not limiting. Many other applications and embodiments of the present disclosure will be apparent in light of this disclosure.

What is claimed is:

1. A switch system to network a plurality of systems, comprising:
   a plurality of leaf modules, each of the leaf module having a plurality of internal ports;
   a plurality of spine modules, each of the spine module having a plurality of ports; and
   a midplane with a plurality of first layers, a plurality of second layers and a plurality of third layers, the plurality of first layers disposed closer to a first side of the midplane, the plurality of second layers disposed closer to a second side of the midplane and the plurality of third layers disposed between the plurality of first layers and the plurality of second layers; wherein the midplane is configured to receive the plurality of leaf modules and the plurality of spine modules about both the first side and the second side and a plurality of conductors disposed about the third layer configured to couple internal ports of the leaf modules disposed about one side to a port of spine module disposed about the other side;
   wherein a plurality of conductors disposed about the first layer configured to couple internal ports of the leaf modules disposed about the first side to a port of spine module disposed about the first side;
   wherein a plurality of conductors disposed about the second layer configured to couple internal ports of the leaf modules disposed about the second side to a port of spine module disposed about the second side; and
   wherein the midplane includes a top portion, a bottom portion, a mid portion disposed between the top portion and the bottom portion and a plurality of first midplane connectors disposed about the mid portion, the plurality of second midplane connectors disposed about the top portion and the bottom portion.

2. The system of claim 1, wherein the first midplane connectors disposed on the first side are offset from the adjacent first midplane connectors disposed on the second side.

3. The system of claim 2, wherein the second midplane connectors disposed on the first side are offset from the adjacent second midplane connectors disposed on the second side.

4. The system of claim 2, wherein the first midplane connectors are configured to receive the plurality of spine modules.

5. The system of claim 3, wherein the second midplane connectors are configured to receive the plurality of leaf modules.

6. A chassis for a switch system, comprising:
   a midplane, including:
      a circuit board carrier with a first side and a second side opposite the first side, the circuit board carrier further including a plurality of first layers disposed closer to the first side, a plurality of second layer disposed closer to the second side and a plurality of third layer disposed between the first layer and the second layer, a plurality of conductors disposed on the plurality of first layer, second layer and the third layer;
      a plurality of first midplane connectors disposed on both the first side and the second side; and
      a plurality of second midplane connectors disposed on both the first side and the second side, the first midplane connectors coupled to the second midplane connectors through one or more conductors such that conductors on the plurality of first layers couple the first midplane connectors and the second midplane connectors disposed on the first side, the conductors on the plurality of second layers couple the first midplane connector to the second connectors disposed on the second side and the conductors on the plurality third layer couple first midplane connector on one side to second midplane connectors on the other side;
   wherein the circuit board carrier includes a top portion, a bottom portion, a mid portion disposed between the top portion and the bottom portion and the plurality of first midplane connectors disposed about the mid portion, the plurality of second midplane connectors disposed about the top portion and the bottom portion.

7. The chassis of claim 6, wherein the first midplane connectors disposed on the first side are offset from the adjacent first midplane connectors disposed on the second side.

8. The chassis of claim 7, wherein the second midplane connectors disposed on the first side are offset from the adjacent second midplane connectors disposed on the second side.

9. The chassis of claim 6, wherein the first midplane connectors are configured to receive a plurality of spine modules with a plurality of ports.

10. The chassis of claim 9, wherein the second midplane connectors are configured to receive a plurality of leaf modules with a plurality of internal ports.

11. The chassis of claim 10, wherein an internal port of a leaf module is coupled to at least one port of all the spine modules through one or more of the conductors of the circuit board carrier.

12. A method of configuring a switch system, comprising:
providing a midplane with a plurality of first layers, a plurality of second layers and a plurality of third layers;
disposing the plurality of first layers closer to a first side of the midplane, the plurality of second layers closer to a second side of the midplane and the plurality of third layers between the first layers and the second layers;
providing a plurality of leaf modules with internal ports about both the first side and the second side;
providing a plurality of spine modules with ports about both the first side and the second side;
coupling internal ports of the leaf modules disposed about one side of the midplane to a port of the plurality of spine modules disposed about the other side using a plurality of conductors disposed on the plurality of third layers;
coupling internal ports of the leaf modules about the first side to a port of the plurality of spine modules about the first side with a plurality of conductors disposed on the plurality of first layers;
coupling internal ports of the leaf modules about the second side to a port of the plurality of spine modules about the second side with a plurality of conductors disposed on the plurality of second layers;
disposing a plurality of midplane connectors about a top portion and a bottom portion of the midplane, about both the first side and the second side such that adjacent midplane connectors on the first side and the second side are offset from each other along the length of the midplane; and
coupling the plurality of leaf modules to the midplane, by coupling leaf module connectors with the midplane connectors disposed about the top portion and bottom portion of the midplane such that an internal port of a leaf module is coupled to a port of a spine module.

13. The method of claim 12, wherein a spine module pair includes a pair of spine modules, with each spine module including a spine module connector configured to couple to a midplane connector disposed about the mid portion, the pair of spine module connectors of adjacent spine module pairs disposed about the first side and the second side are offset from each other along the length of the midplane.

* * * * *

UNITED STATES PATENT AND TRADEMARK OFFICE
CERTIFICATE OF CORRECTION

PATENT NO.       : 8,060,682 B1
APPLICATION NO.  : 12/415873
DATED            : November 15, 2011
INVENTOR(S)      : Wayne A. Genetti et al.

It is certified that error appears in the above-identified patent and that said Letters Patent is hereby corrected as shown below:

In column 1, line 36, delete "interconnected," and insert -- interconnected --, therefor.

In column 1, line 59, delete "with" and insert -- with a --, therefor.

In column 3, line 16, delete "ports" and insert -- ports of --, therefor.

In column 3, line 18, delete "midplane" and insert -- midplane of --, therefor.

In column 4, line 10, delete "IF" and insert -- IB --, therefor.

In column 4, line 10, delete "IF" and insert -- IB --, therefor.

In column 4, line 67, after "("I/O")" delete "input/output".

In column 5, line 58, delete "each" and insert -- each be --, therefor.

In column 6, line 13, delete "some" and insert -- spine --, therefor.

In column 6, line 16, delete "154A-154F" and insert -- 154A-154D --, therefor.

In column 6, line 67, delete "2020" and insert -- 202C --, therefor.

In column 7, line 6, delete "2040" and insert -- 204C --, therefor.

In column 7, line 6, delete "2040" and insert -- 204C --, therefor.

In column 7, line 8, delete "2080" and insert -- 208C --, therefor.

In column 7, line 10, delete "2080" and insert -- 208C --, therefor.

In column 1, line 18, delete "2040" and insert -- 204C --, therefor.

In column 7, line 18, delete "2020" and insert -- 202C --, therefor.

Signed and Sealed this
Twenty-fourth Day of January, 2012

David J. Kappos
*Director of the United States Patent and Trademark Office*

In column 7, line 51, after "200" insert -- . --.

In column 8, line 9, after "modules" insert -- of a --.

In column 8, line 34, delete "311E2." and insert -- 311H2. --, therefor.

In column 9, line 5, delete "may" and insert -- may be --, therefor.

In column 9, line 37, delete "3025-3021" and insert -- 302P-302T --, therefor.

In column 9, line 62, delete "30952" and insert -- 309F2 --, therefor.

In column 9, line 62, delete "31152." and insert -- 311F2. --, therefor.

In column 10, line 4, delete "3085" and insert -- 308B --, therefor.

In column 10, line 7, Delete "3085." and insert -- 308B. --, therefor.

In column 10, line 7, delete "31151" and insert -- 311B1 --, therefor.

In column 10, line 7, delete "31152" and insert -- 311B2 --, therefor.

In column 10, line 8, delete "30991" and insert -- 309B1 --, therefor.

In column 10, line 9, delete "30992" and insert -- 309B2 --, therefor.

In column 10, line 12, delete "30952," and insert -- 309B2, --, therefor.

In column 2, line 12, delete "309" and insert -- 309G2 --, therefor.

In column 10, line 18, delete "3085." and insert -- 308B. --, therefor.

In column 10, line 18, delete "31151" and insert -- 311F1 --, therefor.

In column 10, line 18, delete "31152" and insert -- 311F2 --, therefor.

In column 10, line 19, delete "30951" and insert -- 309F1 --, therefor.

In column 10, line 20, delete "30952" and insert -- 309F2 --, therefor.

In column 10, line 20, delete "30951" and insert -- 309B1 --, therefor.

In column 10, line 21, delete "30952" and insert -- 309F2 --, therefor.

In column 10, line 28, delete "3025" and insert -- 302B --, therefor.

In column 10, line 29, delete "302C" and insert -- 302G --, therefor.

In column 10, line 43, delete "reference" and insert -- reference to --, therefor.

In column 11, line 21, delete "have" and insert -- have a --, therefor.

In column 11, line 35, delete "plurality" and insert -- plurality of --, therefor.

In column 12, line 9, delete "port" and insert -- port of --, therefor.

In column 12, line 29, delete "3025" and insert -- 302B --, therefor.

In column 12, line 30, delete "3058." and insert -- 305B. --, therefor.

In column 2, line 37, delete "3158" and insert -- 315B --, therefor.

In column 12, line 38, delete "3158" and insert -- 315B --, therefor.

In column 12, line 41, delete "319E8." and insert -- 319EB. --, therefor.

In column 12, line 52, delete "3058" and insert -- 305B --, therefor.

In column 12, line 54, delete "3028" and insert -- 302B --, therefor.

In column 12, line 58, delete "3028" and insert -- 302M --, therefor.

In column 12, line 59, delete "317D5" and insert -- 317DB --, therefor.

In column 12, line 61, delete "31755" and insert -- 317BB --, therefor.

In column 12, line 62, delete "30552" and insert -- 305B2 --, therefor.

In column 12, line 62, delete "3058" and insert -- 305B --, therefor.

In column 12, line 64, delete "3028" and insert -- 302B --, therefor.

In column 12, line 65, delete "30851." and insert -- 308E1. --, therefor.

In column 12, line 65, delete "31955" and insert -- 319BB --, therefor.

In column 12, line 67, delete "323F2" and insert -- 323E2P2 --, therefor.

In column 13, line 3, delete "31955" and insert -- 319BB --, therefor.

In column 13, line 3, delete "3215." and insert -- 321B. --, therefor.

In column 13, line 5, delete "bottom," and insert -- bottom --, therefor.

In column 13, line 9, delete "some" and insert -- spine --, therefor.

In column 13, line 16, delete "31755" and insert -- 317BB --, therefor.

In column 13, line 17, delete "3058" and insert -- 305B --, therefor.

In column 13, line 20, delete "31755" and insert -- 317BB --, therefor.

In column 13, line 21, delete "3218." and insert -- 321B. --, therefor.

CERTIFICATE OF CORRECTION (continued)
U.S. Pat. No. 8,060,682 B1

In column 13, line 22, delete "317C8" and insert -- 317CB --, therefor.

In column 13, line 23, delete "30583" and insert -- 305B3 --, therefor.

In column 13, line 23, delete "3058" and insert -- 305B --, therefor.

In column 13, line 24, delete "323E283" and insert -- 323E2P3 --, therefor.

In column 13, line 24, delete "31152" and insert -- 311E2 --, therefor.

In column 13, line 25, delete "3028" and insert -- 302B --, therefor.

In column 13, line 28, delete "31955" and insert -- 319BB --, therefor.

In column 13, line 35, delete "3025" and insert -- 302M --, therefor.

In column 13, line 39, delete "3025" and insert -- 302M --, therefor.

In column 13, line 52, delete "3155" and insert -- 315E --, therefor.

In column 13, line 53, delete "3155" and insert -- 315E --, therefor.

In column 13, line 59, delete "30251" and insert -- 302M --, therefor.

In column 13, line 63, delete "30517" and insert -- 305L7 -- therefor.

In column 13, line 65, delete "319HE" and insert -- 319GE --, therefor.

In column 14, line 1, delete "323A158." and insert -- 323A1P8. --, therefor.

In column 14, line 26, delete "A1," and insert -- 321A1, --, therefor.

In column 14, line 53, after "include" insert -- a --.

In column 14, line 55, delete "some" and insert -- spine --, therefor.

In column 15, line 17, delete "30551-305A5" and insert -- 305A1-305A5 --, therefor.

In column 15, line 42, delete "45," and insert -- 4C, --, therefor.

In column 17, line 4, delete "308B2," and insert -- 308B1, --, therefor.

In column 17, line 11, delete "305EIV." and insert -- 305E1V. --, therefor.

In column 17, line 17, delete "3120." and insert -- 312C. --, therefor.

In column 17, line 27, delete "32351," and insert -- 323F1, --, therefor.

In column 18, line 25, delete "323FIPIRX" and insert -- 323F1P1RX --, therefor.

In column 18, line 35, delete "35" and insert -- 3E --, therefor.

CERTIFICATE OF CORRECTION (continued)
U.S. Pat. No. 8,060,682 B1

In column 18, line 36, delete "too" and insert -- top --, therefor.

In column 18, line 57, after "layers," insert -- a --.

In column 19, line 22, after "ports of" insert -- spine --.